(12) United States Patent  (10) Patent No.: US 9,376,133 B2
Sun  (45) Date of Patent: Jun. 28, 2016

(54) STROLLER

(71) Applicant: Kyung shin Sun, Seoul (KR)

(72) Inventor: Kyung shin Sun, Seoul (KR)

( * ) Notice: Subject to any disclaimer, the term of this patent is extended or adjusted under 35 U.S.C. 154(b) by 0 days.

(21) Appl. No.: 14/712,251

(22) Filed: May 14, 2015

(65) Prior Publication Data
US 2015/0329135 A1   Nov. 19, 2015

(30) Foreign Application Priority Data

May 14, 2014 (KR) .................. 10-2014-0057976
Jan. 28, 2015 (KR) .................. 20-2015-0000664 U
May 11, 2015 (KR) .................. 20-2015-0003001 U

(51) Int. Cl.
  B62B 7/08   (2006.01)
  B62B 9/24   (2006.01)
  B62B 9/14   (2006.01)
  B62B 9/12   (2006.01)
  B62B 7/14   (2006.01)
  B62B 9/26   (2006.01)

(52) U.S. Cl.
  CPC ............. B62B 7/086 (2013.01); B62B 7/142 (2013.01); B62B 9/12 (2013.01); B62B 9/147 (2013.01); B62B 9/24 (2013.01); B62B 9/26 (2013.01)

(58) Field of Classification Search
  CPC .......... B62B 7/06; B62B 7/08; B62B 7/086; B62B 7/142; B62B 9/12; B62B 9/14; B62B 9/147; B62B 9/142; B62B 9/24; B62B 9/26

USPC ......... 180/642, 643, 644, 647, 648, 649, 650, 180/657, 658; 280/642, 643, 644, 647, 648, 280/649, 650, 657, 658
See application file for complete search history.

(56) References Cited

U.S. PATENT DOCUMENTS

| | | | | |
|---|---|---|---|---|
| 5,125,674 A | * | 6/1992 | Manuszak ................. | B62B 7/12 280/30 |
| 5,263,730 A | * | 11/1993 | Roach ....................... | B62B 7/04 280/47.4 |
| 7,226,059 B1 | * | 6/2007 | Samuels .................. | B62B 3/027 280/33.991 |
| 8,316,483 B2 | * | 11/2012 | Thomas .................... | A47D 5/00 256/25 |
| 8,388,015 B2 | * | 3/2013 | Chen ....................... | B62B 3/007 280/642 |
| 2014/0353945 A1 | * | 12/2014 | Young ..................... | B62B 3/02 280/650 |

* cited by examiner

Primary Examiner — John Walters
(74) Attorney, Agent, or Firm — Rabin & Berdo, P.C.

(57) ABSTRACT

A stroller is provided. A support frame (100) of the stroller includes a pair of vertical bars (120), lengths of which are vertically controllable in a telescopic manner, and provided to be spaced apart from each other, a one-side support (111) and an other-side support (112) respectively disposed at one side and the other side to include horizontal bars (130) having both ends connected to the pair of vertical bars to support the pair of vertical bars, and side supports (150) and a bottom support (160). The stroller also includes extension rods (140) respectively coupled to be capable of vertically moving into or out of upper ends of the vertical bars, an inner sheet (400) formed in a shape corresponding to an internal space of the support frame, detachable members (180) detachably coupled to the extension rods, and a sun cover (500) coupled to the detachable members.

5 Claims, 34 Drawing Sheets

STROLLER

CROSS-REFERENCE TO RELATED APPLICATION

This application claims priority to and the benefit of Korean Patent Application No. 2014-57976, filed on May 14, 2014, the disclosure of which is incorporated herein by reference in its entirety.

BACKGROUND

1. Field of the Invention

The present invention relates to a stroller, and more particularly, to a stroller, a folding function of which can be easily and conveniently performed to greatly improve convenience of use, and in which stability and easy and quick installation and uninstallation of a sun cover are guaranteed, and there is no need to uninstall the sun cover even when the stroller is folded.

2. Discussion of Related Art

The present invention relates to a stroller.

Generally, a stroller configured to carry infants or toddlers includes a support frame 1 having wheels 2 at a lower end, and a seat portion 4 installed at the support frame 1 and capable of carrying an infant or a toddler as shown in FIG. 1.

Here, since the support frame 1 includes a handle 3, the stroller may be able to be moved forward or backward by a user grasping the handle 3 and pushing or pulling the handle 3 in a state in which the infant or toddler rides in the seat portion 4.

Brake system structures for strollers are disclosed in detail in several older documents such as Utility Model Registration No. 20-0464952, and thus detailed description will be omitted.

However, there are difficulties when the stroller is used for loading or various other uses other than carrying an infant or a toddler.

Thus, the present invention provides a stroller configured to compensate for the difficulties, while simultaneously having a stronger folding structure and greatly improving convenience of use.

SUMMARY OF THE INVENTION

The present invention is directed to a stroller applying a folding method and in which safety of the stroller is improved by including a support frame having a safe and convenient folding structure, and detachable members through which a sun cover can be conveniently and quickly detached from or attached to extension rods, and an inner sheet having safety belts.

In addition, the present invention is also directed to a stroller in which extension rods can easily, conveniently, and safely move in or out due to a bottom support structure provided to improve riding quality of the stroller and a structure of extension rods simultaneously provided to be moved in or out by extension rod controllers, and an economical stroller is provided by reducing a manufacturing cost of the extension rod controllers.

In addition, the present invention is also directed to a stroller in which usability is maximized by improving a coupling portion structure of an inner sheet coupled to a support frame so that coupling and decoupling of the inner sheet to or from the support frame is easily and quickly performed, and including a storage member capable of being easily and quickly detached from or attached to the support frame.

The above objects and various advantages of the present invention may be clearly understood by those skilled in the art from the exemplary embodiments of the invention.

According to an aspect of the present invention, there is provided a stroller, including: a support frame 100 including a pair of vertical bars 120, lengths of which are vertically controllable in a telescopic manner, and provided to be spaced apart from each other, a one-side support 111 and an other-side support 112 respectively disposed at one side and the other side to include horizontal bars 130 having both ends connected to the pair of vertical bars to support the pair of vertical bars, and side supports 150 and a bottom support 160 configured to connect the one-side support and the other-side support to form a square frame shape having an upper side opened with the one-side support and the other-side support and form side frames and a bottom frame, wherein the side supports and the bottom support enable the one-side support and the other-side support to be adjacent to or spaced apart from each other in a folding manner in conjunction with lifting or lowering of the vertical bars; extension rods 140 respectively coupled to be capable of vertically moving into or out of upper ends of the vertical bars; an inner sheet 400 formed in a shape corresponding to an internal space of the support frame to be accommodated in the internal space of the support frame, having one or both of one side and the other side coupled to safety belts 450, and having coupling portions detachably coupled to the horizontal bars and the side supports at an upper end circumference thereof; detachable members 180 detachably coupled to the extension rods; and a sun cover 500 coupled to the detachable members, integrally detached from and attached to the extension rods according to detachment and attachment of the detachable members from and to the extension rods, and configured to cover an upper side portion of the support frame.

At this time, each of the vertical bars includes a lifting bar 127 configured to move into or out of an upper end of the vertical bar in a telescopic manner, having an upper end which has a cylindrical shape in which an upper side is opened, and having an inner circumferential surface which has second threads, and an extension rod controller 300 configured to allow the extension rod to vertically move in or out, or to be fixed and coupled to and restrict the lifting bar, and the extension rod controller includes a first extension rod controller 300-1 or a second extension rod controller 300-2, and the first extension rod controller includes a first header 310-1 having a first through hole configured to vertically pass therethrough; and an expansion-contraction portion 320-1 having one or more cut portions 322-1 configured to extend downward from the first header, having first threads 321-1 capable of being coupled to the second threads on an outer circumferential surface thereof, and having a lower end portion cut toward an upper side thereof, and the extension rod is restricted by the expansion-contraction portion being contracted toward an inside and being in tight contact with an outer circumferential surface of the extension rod when the extension rod vertically passes through the first header and the expansion-contraction portion and the first threads and the second threads are screw-coupled to each other, and the extension rod is capable of vertically moving when the first threads and the second threads are unscrewed from a screw-coupled state and the expansion-contraction portion expands, and the second extension rod controller includes: a controller body 310-2 having third threads 312-2 formed at an inner circumferential surface, having a second through hole 313-2 formed at a center of an upper side surface, including a plurality of guide films 314-2 extending downward a certain length along a cut portion of the second through hole to form a coupling space 316-2 between the inner circumferential surface and the plurality of guide films, and including a cap 311-2 in which gaps 315-2 are formed between the plurality of guide films; a coupling body 320-2 including a second header 321-2 which has an extension portion 322-2 having fourth threads formed at an outer circumferential surface, enabling the fourth threads to be coupled to the third threads, contracting the guide film toward an inside thereof, and coupled to the coupling space, a neck portion connected to have a smaller diameter than the extension portion, and a pipe portion 328-2 configured to extend from the neck portion, having fifth threads formed on outer circumferential surface, configured to be screw-coupled to the second threads of the lifting bar, and having a pipe shape, and the extension rod is restricted by the inner circumferential surface of the extension portion contracting the guide film toward an inside thereof and the guide film and the outer circumferential surface of the extension rod being tightly in contact with each other when the coupling body is coupled to the lifting bar by the fifth threads being coupled to the second threads, the extension rod passes through the second through hole to be inserted into the controller body, the coupling body, and the lifting bar, the third threads and the fourth threads are screw-coupled to each other, and the extension rod is capable of vertically moving when the third threads and the fourth threads are unscrewed from a screw-coupled state and the guide film expands.

In addition, the stroller further includes a storage member 600 including: a storage member frame 610 having an upper side edge portion 611, two or more vertical coupling portions 612 having bending portions 613 configured to extend downward from one side of the upper side edge portion and having lower end portions bent toward other sides thereof; a first storage portion 620 having a storage space formed in an inside thereof and an opened upper side edge coupled to the upper side edge portion 611; and a second storage portion 630 in which the opened upper side edge is detached from or attached to a lower side edge of the first storage portion in a zipper-coupling manner, and two or more horizontal bars of the one-side support are provided from upper portions to lower portions of the pair of vertical bars of the one-side support at predetermined intervals, and the storage member is coupled to the horizontal bar of the one-side support so that the horizontal bar of the one-side support is disposed between the vertical coupling portion and an upper end of the upper side edge and the vertical coupling portion is detached from and attached to two horizontal bars by the bending portion intersecting the two horizontal bars.

In addition, each of the vertical bars includes a lifting bar 127 configured to move into or out of an upper end of the vertical bar in a telescopic manner and having an upper end coupled to an upper bracket 128 and a lower end portion coupled to a lower bracket 124, and the side support includes a first support bar 151 having one end portion coupled to the upper bracket 128 of the one-side support 111 in a vertically pivotable manner and disposed to be extendable downward toward the other side, a second support bar 152 having one end portion coupled to a lower bracket 124 of the one-side support 111 in a vertically pivotable manner, disposed to be extendable upward toward the other side, and having a middle portion intersected by and hinge-coupled to the first support bar 151 in a mutually pivotable manner, a third support bar 153 having one end portion hinge-coupled to the other end portion of the first support bar 151 in a vertically pivotable manner and having the other end portion hinge-coupled to the upper bracket 128 of the other-side support 112, and a fourth support bar 154 having one end portion hinge-coupled to the other end portion of the second support bar 152 in a vertically pivotable manner, having the other end portion hinge-coupled to a lower bracket 124 of the other-side support 112, and having a middle portion intersected by and hinge-coupled to the third support bar in a mutually pivotable manner, and the bottom support 160 includes a pair of frame members having first frame members 161 with one ends hinge-coupled to the lower brackets of the one-side support in a pivotable manner and second frame members 162 with one ends hinge-coupled to the other ends of the first frame members in a pivotable manner and the other ends hinge-coupled to the lower brackets of the other-side support in a pivotable manner, and third frame members 163 connected between the first frame members and the second frame members in one direction, the other direction and a width direction, and the one ends of the first frame members and the other ends of the second frame members are pivoted and lifted when the one-side support and the other-side support are adjacent to each other, and the first frame members and the second frame members are lowered in parallel when the one-side support and the other-side support are spaced apart from each other.

In addition, the detachable member has a cylindrical shape, and includes one side of an outer circumferential surface having a first opening portion 184 in which the extension rod is capable of being coupled or decoupled in a tight-insertion manner and the other side of the outer circumferential surface having a link portion 187 in which middle portions of a second opening portion 188 are spaced a certain distance from each other, and the sun cover has a connection portion vertically penetrated at a corresponding position in which the extension rod is provided, is coupled to the detachable member by an upper end and the other end of the connection portion being insertion-coupled to the link portion through the second opening portion and coupled inside the link portion, and is coupled to the extension rod by the extension rod being tightly inserted through the first opening portion.

In addition, hooking protrusions 139 configured to protrude from an outside thereof are further formed at uppermost horizontal bars among the horizontal bars of the one-side support and the other-side support or one sides and the other sides of the upper brackets, and lead portions 431 configured to extend from each of positions corresponding to both upper end portions of the side supports and having insertion holes insertion-coupled to the hooking protrusions are coupled to the inner sheet, and the coupling portions of the inner sheet comprise cover portions 415 configured to cover portions in which the other end portions of the second support bars and one end portions of the fourth support bars are hinge-coupled to each other and horizontal bar coupling portions 420 configured to be detached and attached in a VELCRO-coupling manner, for example a hook and loop fasteners system, to surround the horizontal bars.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Advantages and features of the present invention and methods of achieving the same will be clearly understood with reference to the accompanying drawings and the following detailed embodiments.

However, the present invention is not limited to the embodiments to be disclosed, but may be implemented in various different forms. The embodiments are provided in order to fully explain the present invention and the scope thereof to those skilled in the art. The scope of the present invention is defined by the appended claims. Throughout the specification, the same reference numbers refer to the same components.

Hereinafter, exemplary embodiments of the present invention will be described in greater detail with reference to the accompanying drawings.

Figure 1:
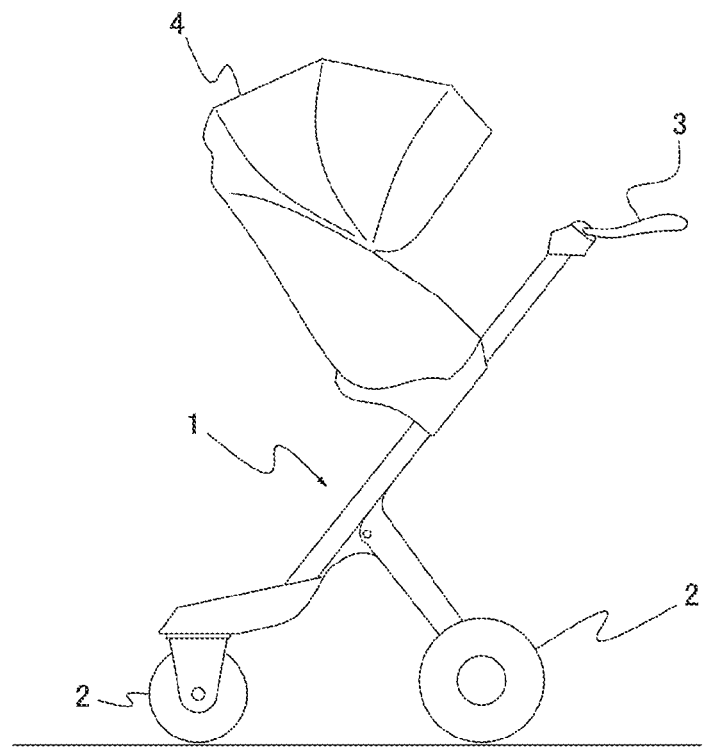
FIG. 1 is a reference view illustrating a conventional stroller.
Figure 2:
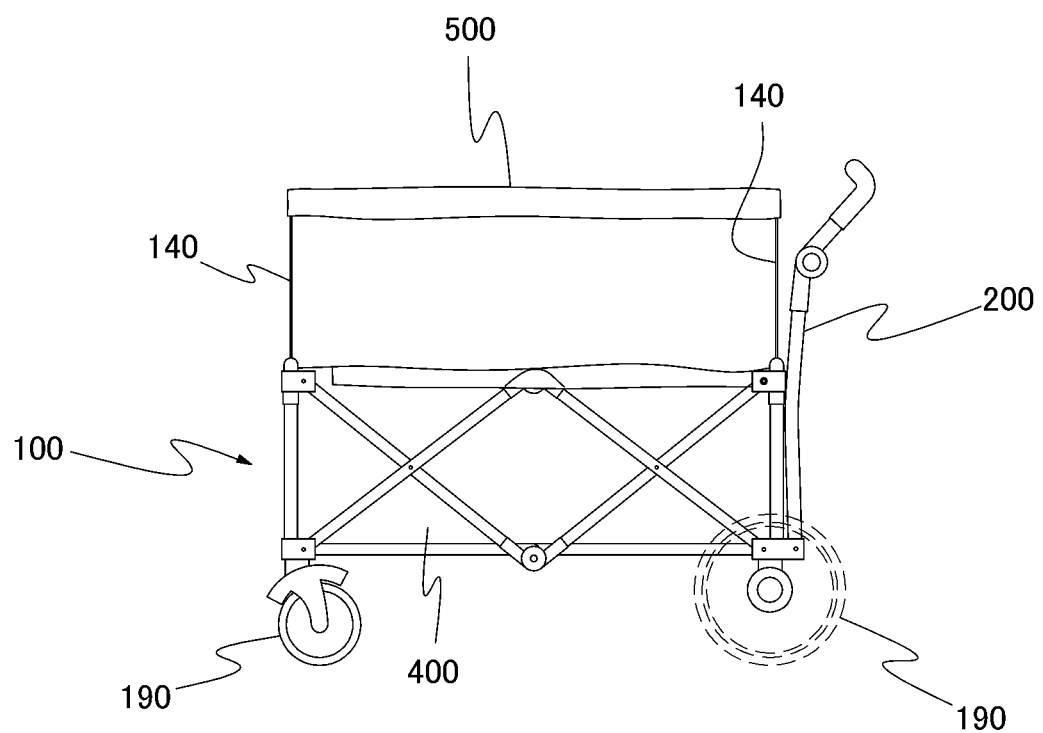
FIGS. 2 and 3 are side views illustrating a configuration of a stroller according to an embodiment of the present invention.
Figure 3:
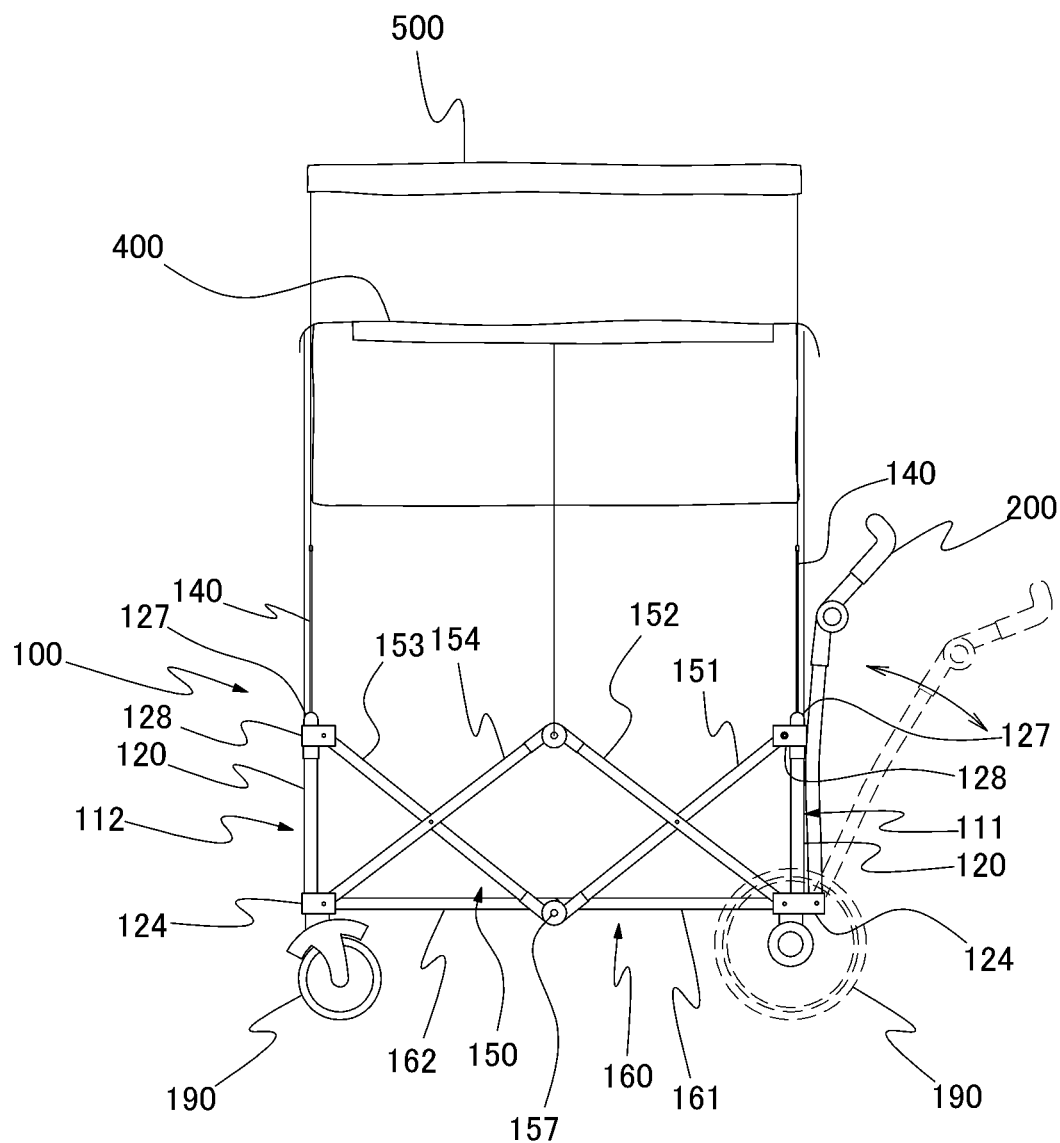
Figure 4:
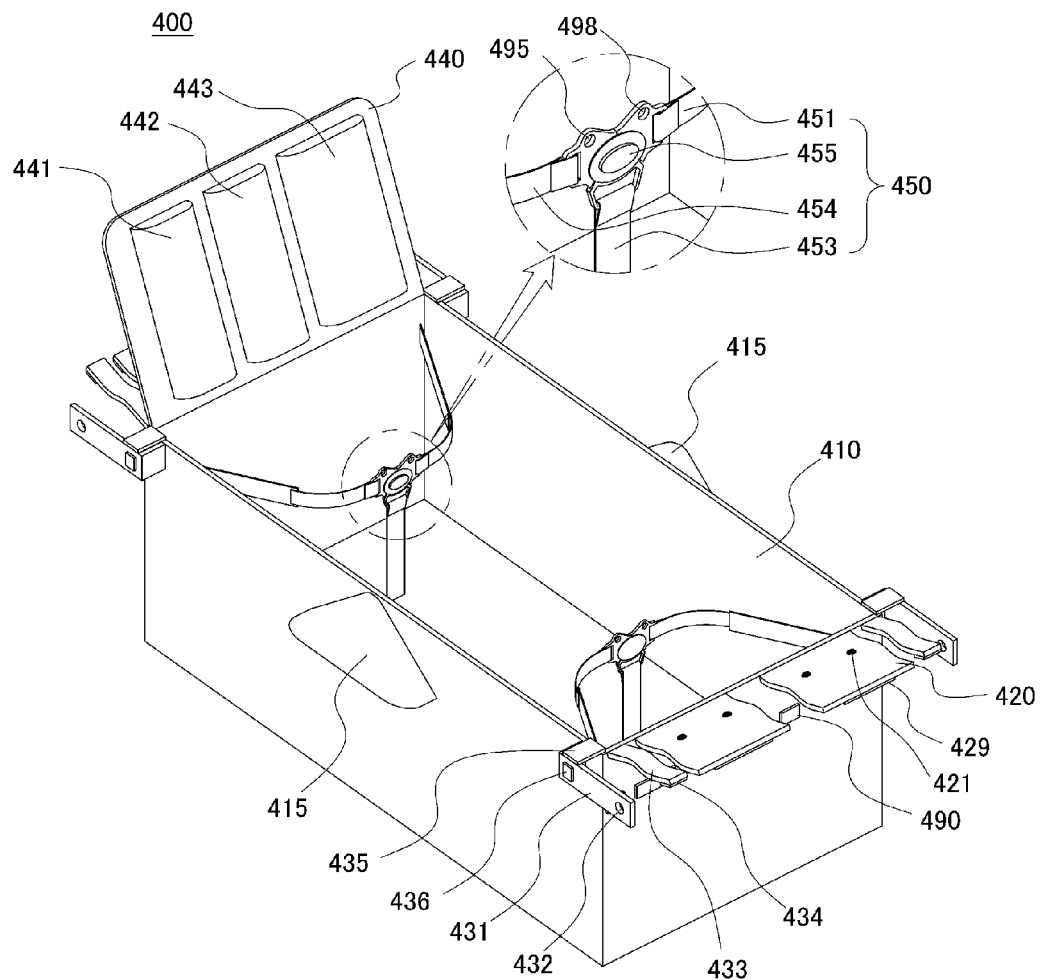
FIG. 4 is a perspective view illustrating an inner sheet configuration.
Figure 5:
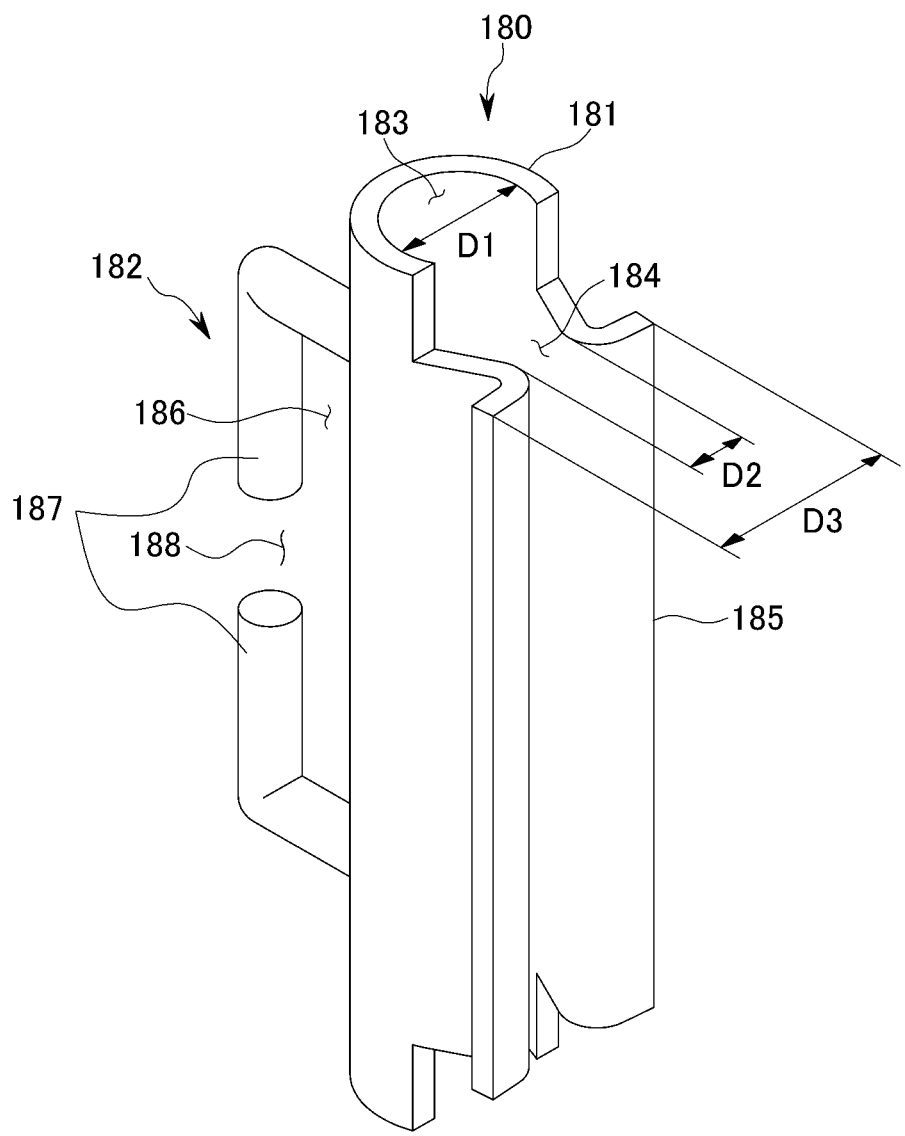
FIG. 5 is a perspective view illustrating a detachable member configuration.
Figure 6:
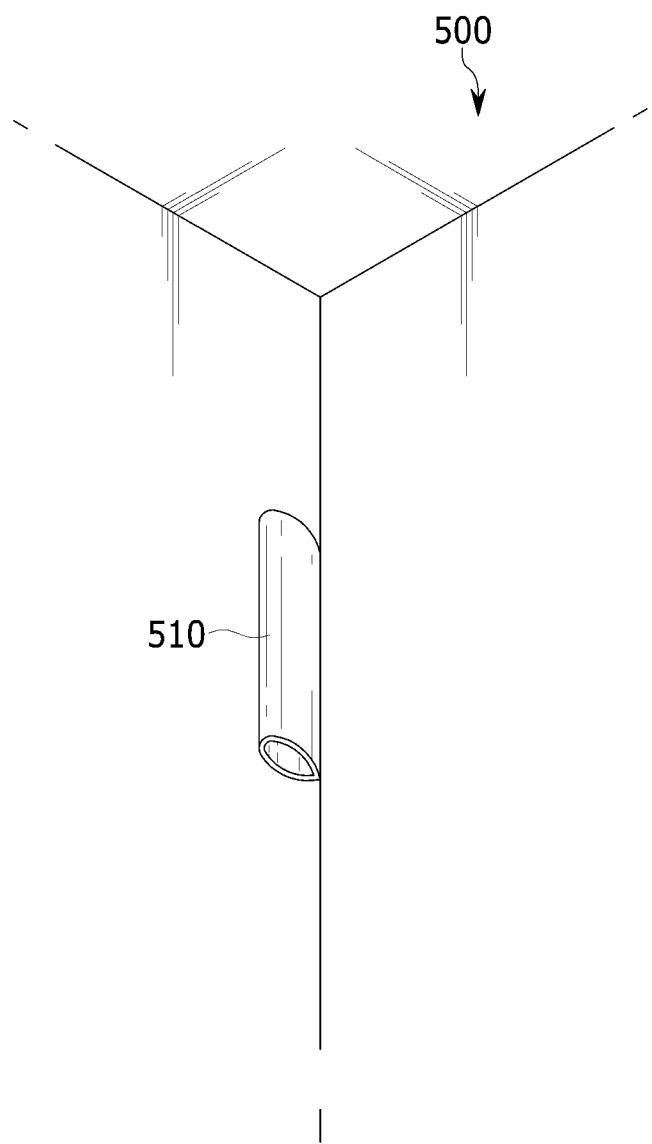
FIG. 6 is a partial perspective view illustrating a configuration of a sun cover having a connection portion.
Figure 7:
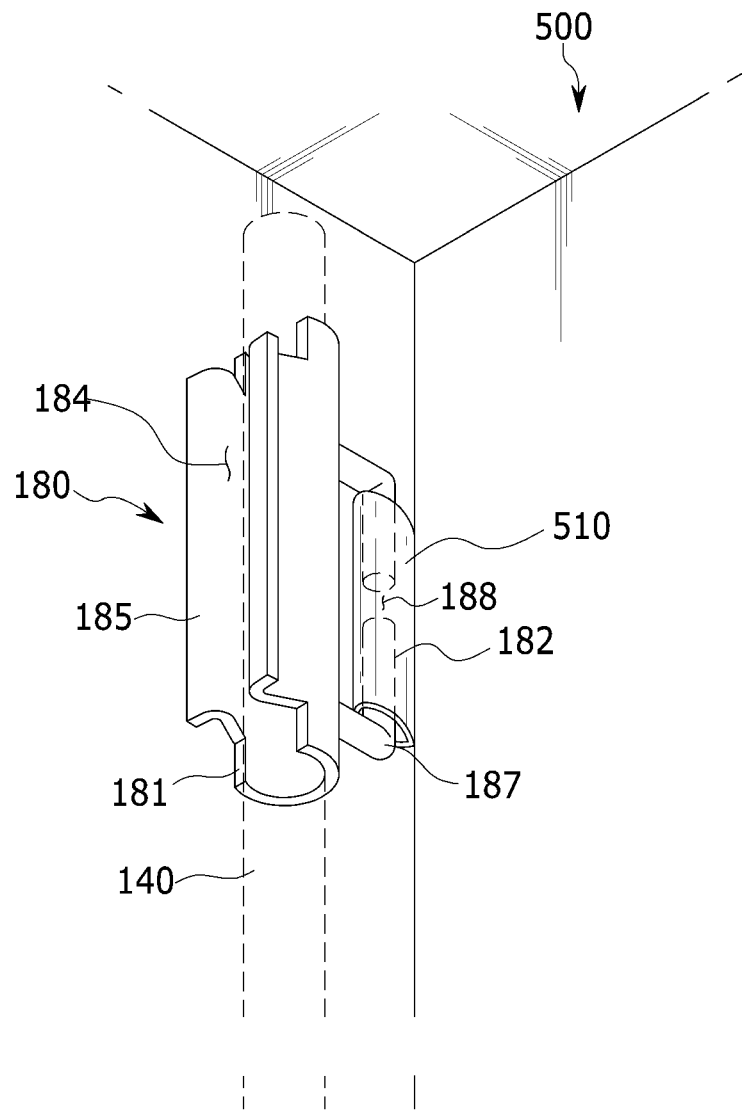
FIG. 7 is a coupling view illustrating a configuration of a state in which a sun cover is coupled to an extension rod.

FIGS. 2 and 3 are side views illustrating a configuration of a stroller according to an embodiment of the present invention, FIG. 4 is a perspective view illustrating an inner sheet configuration, FIG. 5 is a perspective view illustrating a detachable member configuration, FIG. 6 is a partial perspective view illustrating a configuration of a sun cover having a connection portion, and FIG. 7 is a coupling view illustrating a configuration of a state in which a sun cover is coupled to an extension rod.

Figure 12:
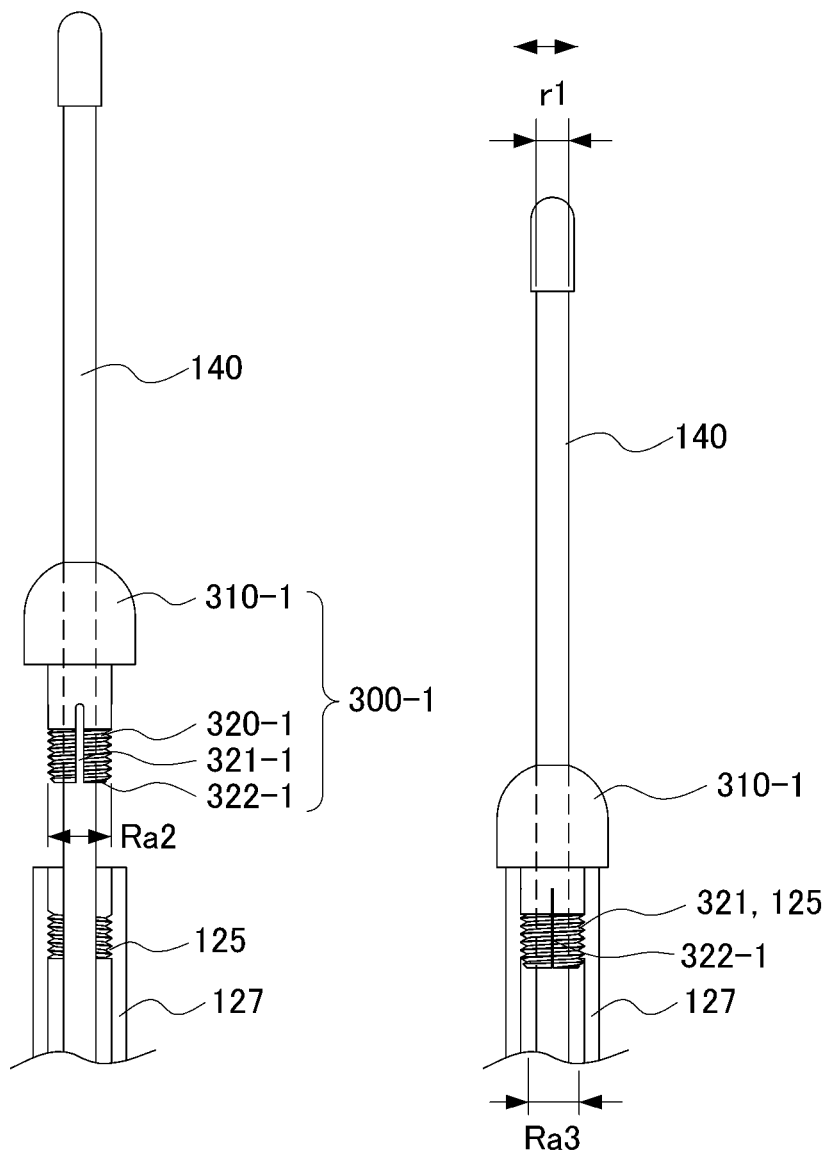
FIG. 12 is a front view illustrating a configuration of an extension rod controller and cases in which an extension rod controller, an extension rod, and a lifting rod are disassembled and assembled.

FIGS. 8 to 11 are side views of a support frame and configuration views illustrating coupling configurations of an extension rod controller, an extension rod, and a vertical bar (or lifting bar), and FIG. 12 is a front view illustrating a configuration of a first extension rod controller and cases in which a first extension rod controller, an extension rod, and a lifting rod are disassembled and assembled.

A stroller according to the present invention includes a support frame 100 which has a one-side support 111, an other-side support 112, side supports 150 configured to connect the one-side support 111 and the other-side support 112 at both sides thereof and form side frames, and a bottom support 160 configured to connect at a lower side, that is a bottom side, and form a bottom frame, and forms an internal space therein in a square frame shape having an upper side opened, extension rods 140, an inner sheet 400 accommodated in the internal space of the support frame 100, detachable members 180 that detach from or attach to the extension rods, and a sun cover 500 that is detached from or attached to the extension rods 140 with the detachable members 180.

The support frame 100 is a support frame to support the stroller according the present invention, that is, a square frame structure in which the internal space is formed and the upper side is opened.

More specifically, the support frame 100 includes a pair of vertical bars 120 configured to vertically move in or out in a telescopic manner and provided to be spaced apart from each other, the one-side support 111 and the other-side support 112 respectively disposed at one side and the other side and configured to include horizontal bars 130 having both ends connected to the pair of vertical bars to support the pair of vertical bars, and the side supports 150 and the bottom support 160 configured to connect the one-side support and the other-side support to form a square frame shape having the upper side opened with the one-side support and the other-side support and form the side frame and the bottom frame.

Here, the side support and the bottom support are formed to allow the one-side support and the other-side support to move toward or away from each other in a folding manner in conjunction with lifting or descending of the vertical bar.

That is, each of frames constituting the side supports 150 and the bottom support 160 is pivotably hinge-coupled to form a folding joint so that the one-side support 111 and the other-side support 112 are adjacent to or spaced apart from each other. Thus, the support frame 100 is folded or unfolded toward the one side or the other side as the vertical bar 120 is lifted when the one-side support 111 and the other-side support 112 are adjacent to each other and the vertical bar 120 descends when the one-side support 111 and the other-side support 112 are spaced apart from each other.

The extension rod 140 is coupled to the vertical bar 120 to be capable of vertically moving into or out of an upper end thereof.

Here, when the extension rod 140 is inserted into the vertical bar without restriction, the extension rod 140 is formed to be capable of protruding from the lifted vertical bar 120 by a predetermined length in a state in which the one-side support 111 and the other-side support 112 are adjacent to each other.

This allows the sun cover 500 to be fixed at an upper end of the extension rod 140 in a state in which the extension rod 140 is pulled out toward an upper side and fixed by an extension rod controller 300 in a state in which the support frame 100 is unfolded, and the support frame 100 is capable of being folded in a state in which the inner sheet 400 and the sun cover 500 are made of flexible sheet materials and the inner sheet and the sun cover are stably coupled to the extension rods.

The inner sheet 400 is formed in a shape corresponding to the internal space of the support frame 100 to be accommodated in the internal space of the support frame, has a safety belt 450 coupled to one or both of the one side and the other side thereof, and has coupling portions detachably coupled to the horizontal bars 130 and the side supports 150 at an upper end circumference thereof.

The inner sheet 400 is formed in a shape capable of being accommodated in the internal space of the support frame 100 as illustrated in FIG. 4.

Here, one or more pockets, that is, a first pocket 441, a second pocket 442, and a third pocket 443, are formed on a surface corresponding to the one-side support 111, and a pocket portion 440 coupled to an upper end of the surface corresponding to the one-side support 111 in a foldable manner is included.

In addition, one or more horizontal bar coupling portions 420 configured to surround the horizontal bar 130 and coupled in a VELCRO-like manner, for example a hook and loop fasteners system, are formed at each of the surfaces corresponding to the one-side support 111 and the other-side support 112.

Here, coupling buttons 421 having a snap button shape may be formed on the horizontal bar coupling portion 420.

Hooking protrusions 139 configured to protrude from an outside thereof are further formed at an uppermost horizontal bar among the horizontal bars of the one-side support and the other-side support or on the one side and the other side of an upper bracket 128.

Here, lead portions 431 configured to extend from each of positions corresponding to both upper end portions of the side supports and having insertion holes insertion-coupled to the hooking protrusions 139 are coupled to the inner sheet 400.

That is, the inner sheet may be coupled to be easily and stably accommodated inside the support frame by the lead portion allowing upper end portions of the side supports adjacent to the one-side support and the other-side support to hang at the uppermost horizontal bars of the one-side support and the other-side support or the hooking protrusions 139 formed at the one sides and the other sides of the upper brackets 128.

The inner sheet may be more easily and strongly coupled to or decoupled from the support frame by coupling first coupling portions 434 having VELCRO 434, for example a hook and loop fasteners system, coupled at positions corresponding to positions of the uppermost horizontal bars of both sides of the one-side support and the other-side support, providing auxiliary VELCRO, for example a hook and loop fasteners system, configured to be detached from and attached to the VELCRO 434, for example a hook and loop fasteners system, at outside surfaces of the inner sheet of lower portions of the first coupling portions 434, and the first coupling portions surrounding the uppermost horizontal bars and coupled to or decoupled from the auxiliary VELCRO, for example a hook and loop fasteners system.

A coupling portion of the inner sheet 400 may include cover portions 415 configured to cover hinge-coupling portions among frames configured to form the side supports 150, and more specifically, the portions in which the other end portions of second support bars and one end portions of fourth support bars which will be more specifically described later are hinge-coupled, and further include the horizontal bar coupling portions 420.

In addition, the safety belt 450 having a third belt 453 configured to support a crotch, a first belt 451 and a second belt 454 in which a right thigh and a left thigh with respect to the third belt are inserted and supported, and a buckle 455 configured to allow the first belt to the third belt to be coupled to or decoupled from each other is coupled to the one side or the other side of the inner sheet 400.

As illustrated in FIG. 5, the detachable member 180 has a cylindrical shape, includes one side of an outer circumferential surface having a first opening portion 184 in which the extension rod 140 is capable of being coupled or decoupled in a tight-insertion manner, and includes the other side of the outer circumferential surface having a link portion 187 in which middle portions of a second opening portion 188 are spaced a certain distance from each other.

Here, as illustrated in FIG. 6 the sun cover 500 has a connection portion vertically penetrated at a corresponding position in which the extension rod 140 is provided, the sun cover and the detachable member are coupled to each other by an upper end and the other end of the connection portion being insertion-coupled to the link portion through the second opening portion and coupled to a second insertion space 186 inside the link portion as illustrated in FIG. 7, and the sun cover is coupled to the extension rod by the extension rod being tightly inserted into a first insertion space 183 formed inside a detachable member body 181 through the first opening portion.

Here, it is preferable that a wing portion 185 in which the extension rod 140 is capable of being guided into the first insertion space 183 be formed at an end portion of the first opening portion 184 of the detachable member body 181.

Figure 8:
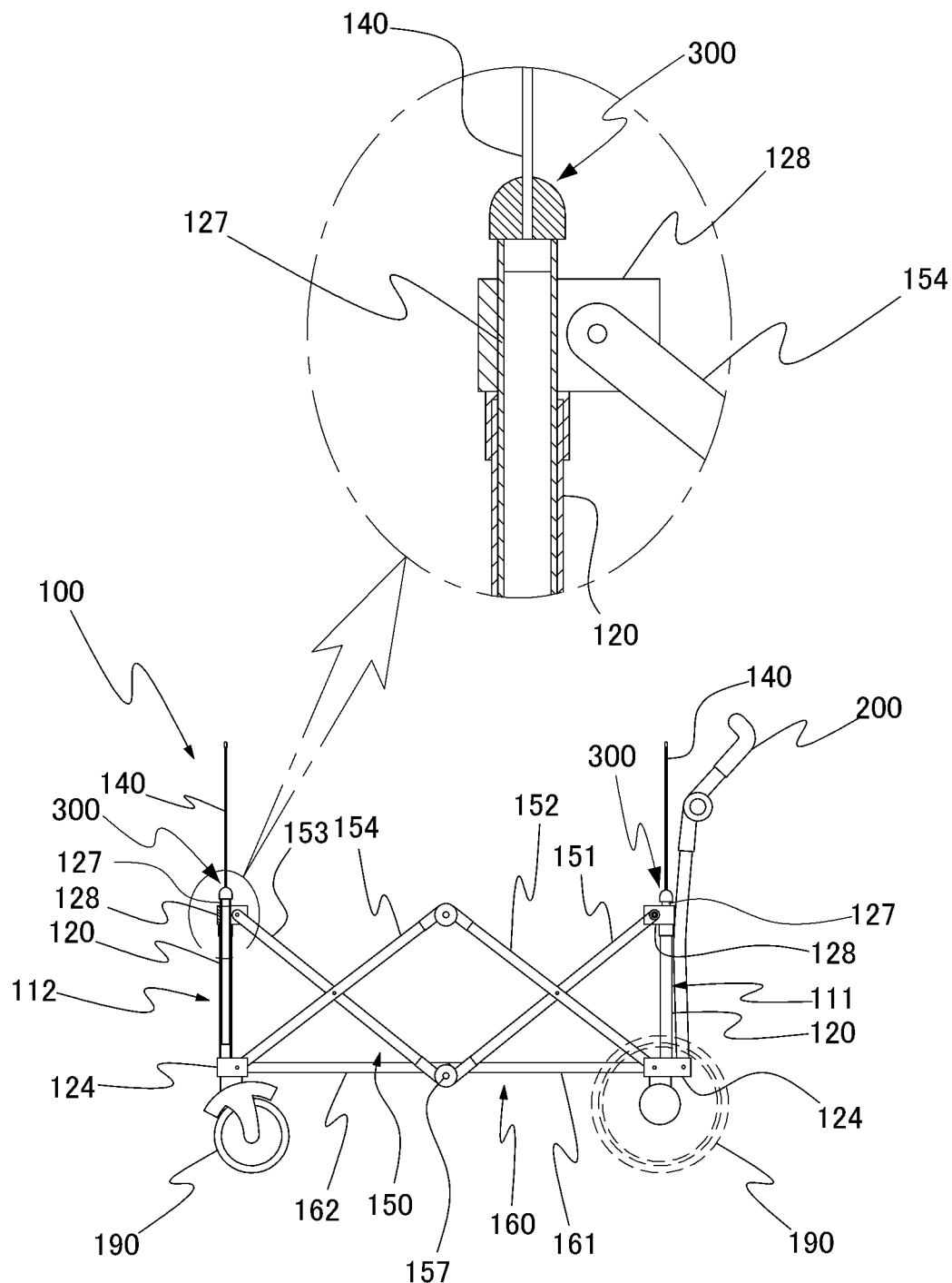
FIGS. 8 to 11 are side views of a support frame and configuration views illustrating coupling configurations of an extension rod controller, an extension rod, and a vertical bar (or lifting bar)
Figure 9:
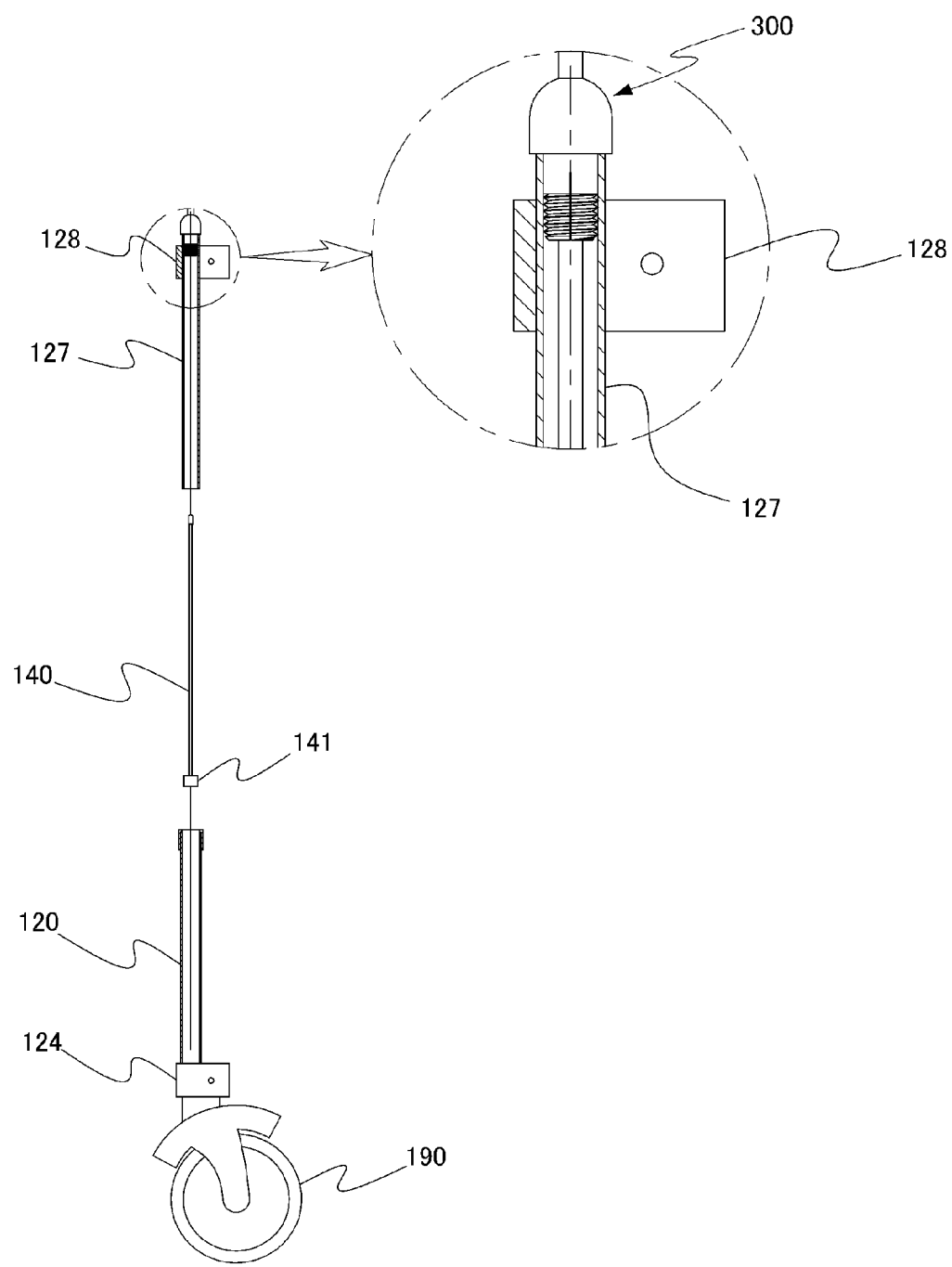
Figure 10:
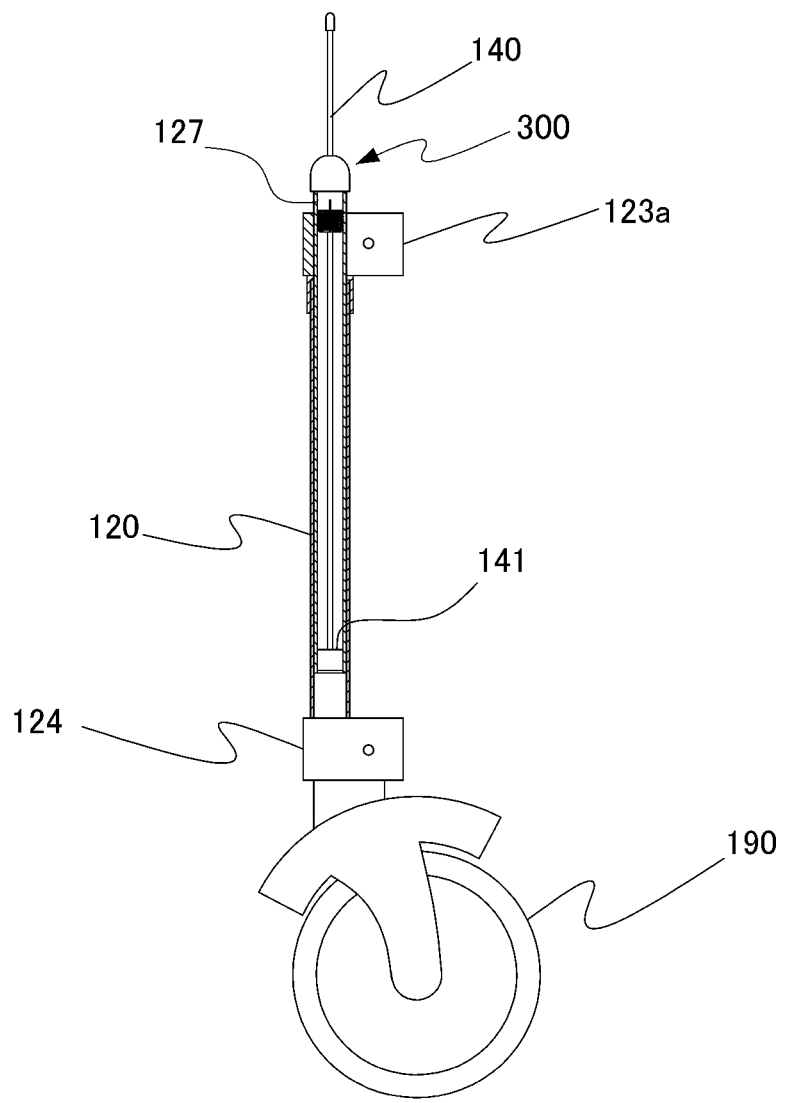
Figure 11:
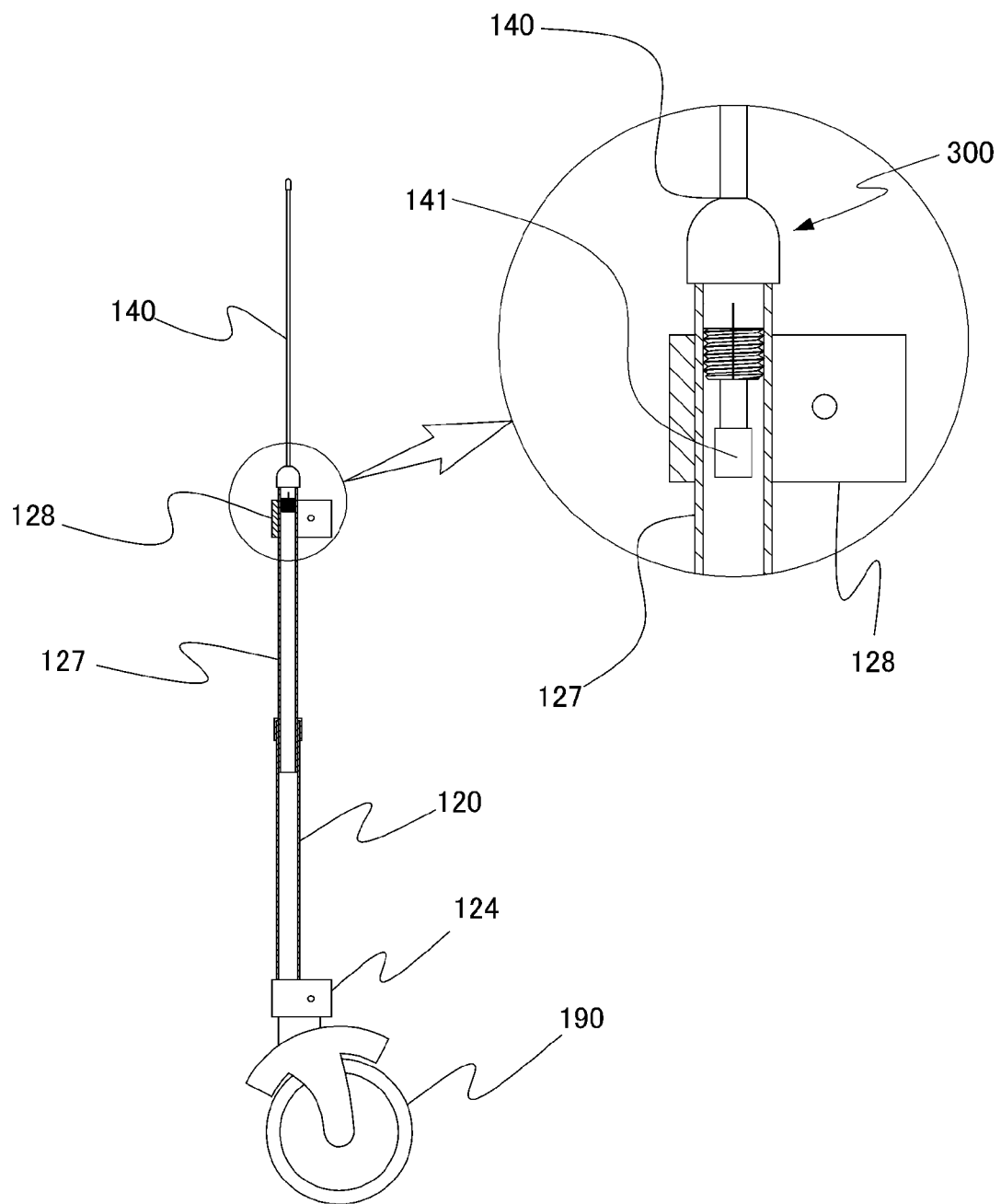

As illustrated in FIGS. 8 to 10, each of the vertical bars 120 includes a lifting bar 127 which moves into or out of an upper end of the vertical bar in a telescopic manner.

That is, vertical length control in the telescopic manner of the vertical bar 120 described above is implemented by the lifting bar 127 moving into or out of the vertical bar 120 in the telescopic manner.

Here, as described above, the extension rod 140 is coupled in a state in which the extension rod 140 is capable of vertically moving into or out of an upper end of the lifting bar 127.

A method in which the extension rod 140 moves into or out of the upper end of the lifting bar 127 is implemented by the extension rod controller 300.

In order to couple an upper end of the lifting bar 127 to the extension rod controller 300, the upper end of the lifting bar has a cylindrical so that the extension rod is capable of moving into or out of and having an upper side opened, and has second threads 125 at an inner circumference thereof.

As illustrated in FIG. 12, the extension rod controller 300-1 includes a having a first through hole which vertically passes through the first header 310-1 and an expansion-contraction portion 320-1 configured to extend downward from the first header 310-1 and having first threads 321-1 capable of being coupled to the second threads at an outer circumferential surface and one or more cut portions 322-1 cut in an upper direction at a lower end thereof, and the extension rod 140 is formed to vertically pass through the first header 310-1 and the expansion-contraction portion 320-1.

Here, the second threads 125 are formed on the inner circumferential surface of the lifting bar 127, and the first threads 321-1 and the cut portion 322-1 are formed at the expansion-contraction portion. When the first threads and the second threads are screw-coupled to each other, the expansion-contraction portion restricts the extension rod by being contracted toward an inside and being in tight contact with an outer circumferential surface of the extension rod, and when the first threads and the second threads are decoupled from a screw-coupled state, the extension rod is capable of vertically moving when the expansion-contraction portion expands.

Figure 13:
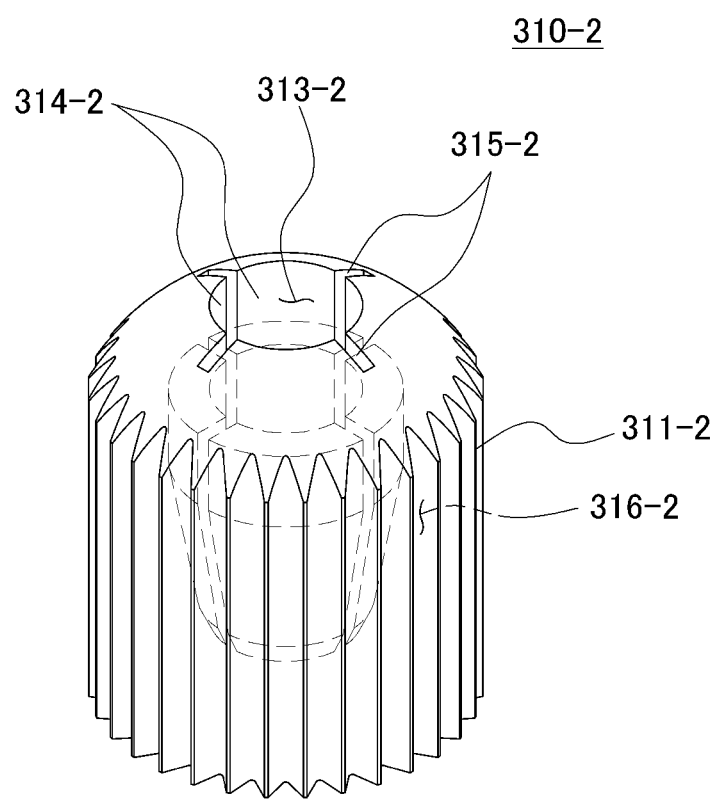
FIG. 13 is a perspective view illustrating a configuration of a controller body of a second extension rod.
Figure 14:
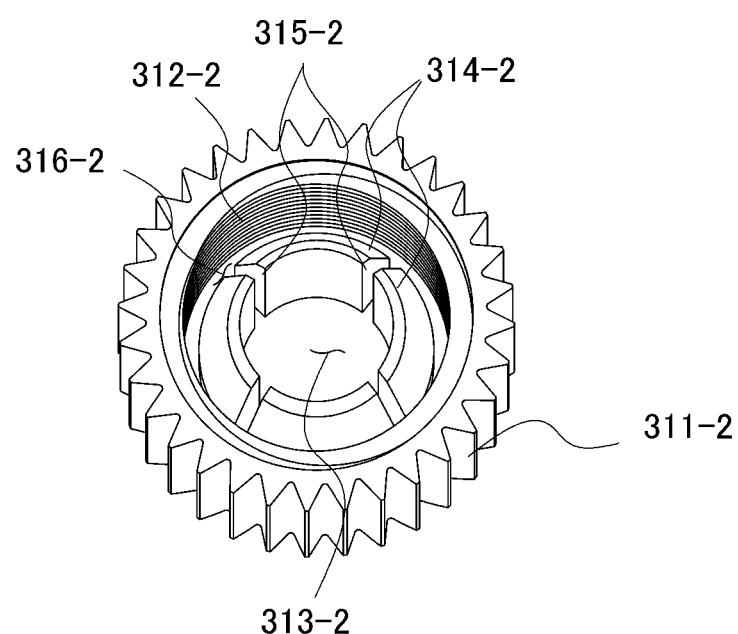
FIG. 14 is a bottom view of a controller body.
Figure 15:
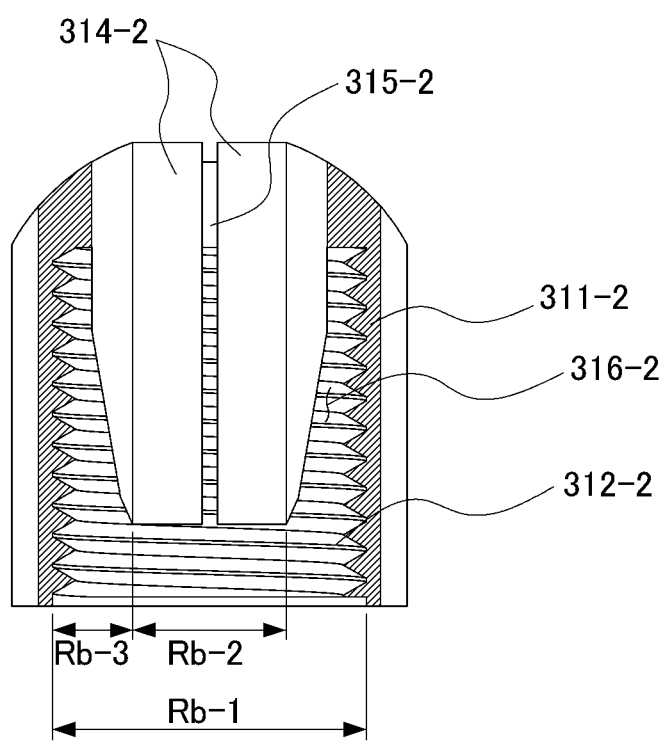
FIG. 15 is a side of the controller body.
Figure 16:
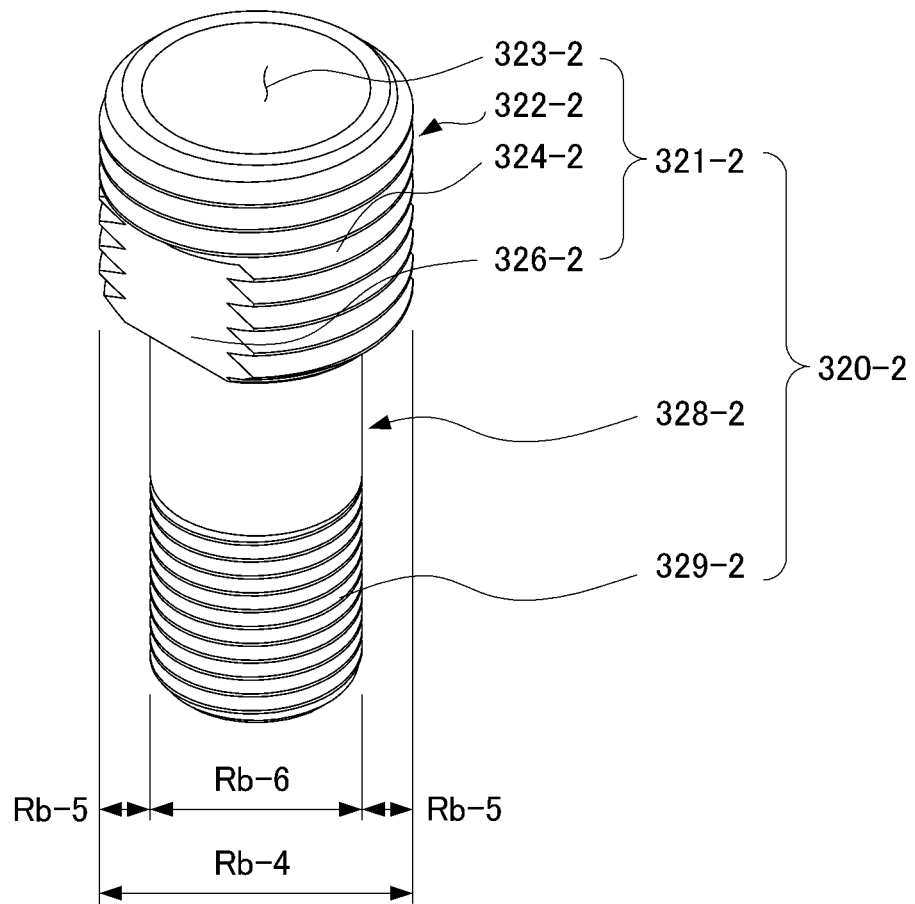
FIG. 16 is a front view illustrating a configuration of the controller body of the second extension rod.

That is, as illustrated in FIG. 12, when the first extension rod controller 300-1 is not screw-coupled to the upper end of the lifting bar 127, the diameter Ra2 of an inner circumferential surface of the expansion-contraction portion 320-1 through which the extension rod passes becomes greater than the diameter R1 of the extension rod by a slight difference, and when screw-coupling between the first extension rod controller 300-1 and the upper end of the lifting bar 127 is completed, the cut portion of the expansion-contraction portion is tightly contacted and contracted by the second threads of the lifting bar and the first threads of the expansion-contraction portion being screw-coupled to each other, the diameter Ra2 of the inner circumferential surface of the expansion-contraction portion is contracted and becomes smaller than the diameter R1 of the extension rod 140, and thus the extension rod 140 is restricted and fixed to the first extension rod controller 300-1. FIG. 13 is a perspective view illustrating a configuration of a controller body of a second extension rod, FIG. 14 is a bottom view of a controller body, FIG. 15 is a side of the controller body, and FIG. 16 is a front view illustrating a configuration of the controller body of the second extension rod.

Figure 17:
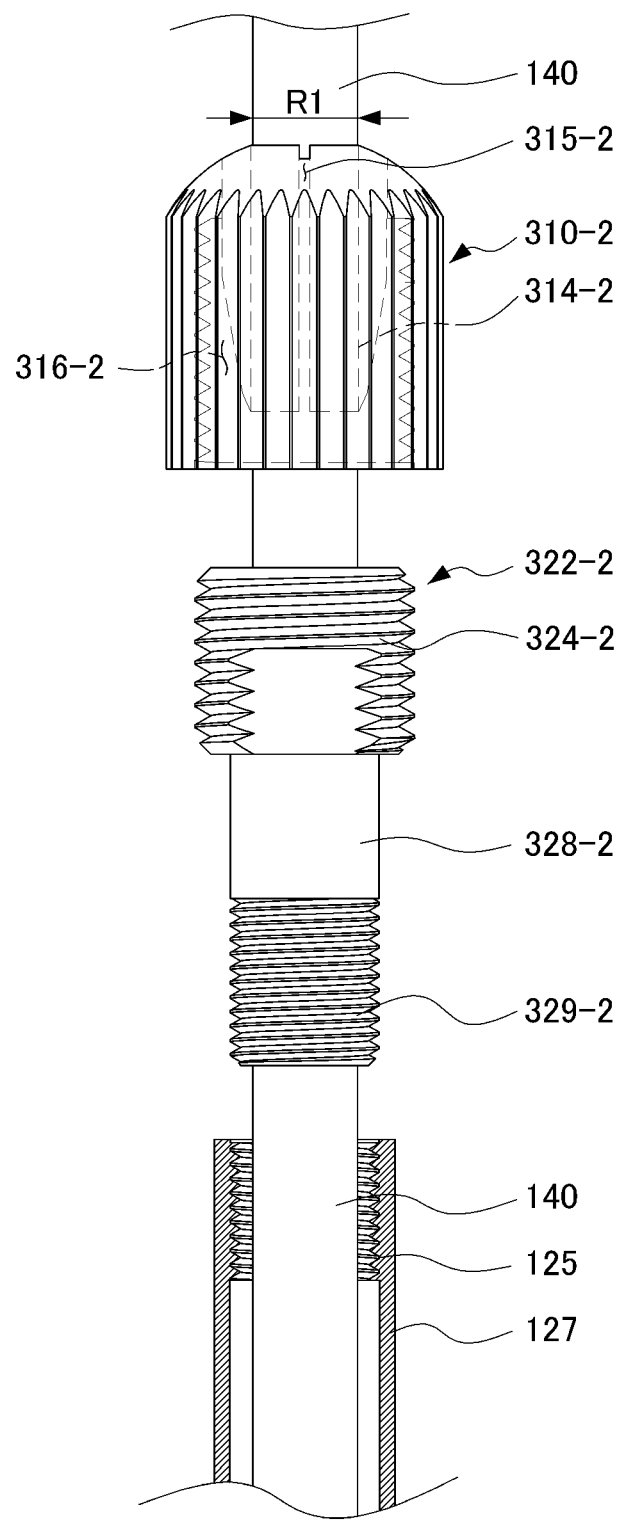
FIG. 17 is a perspective view illustrating a configuration in which the controller body and the coupling body are coupled to each other.
Figure 18:
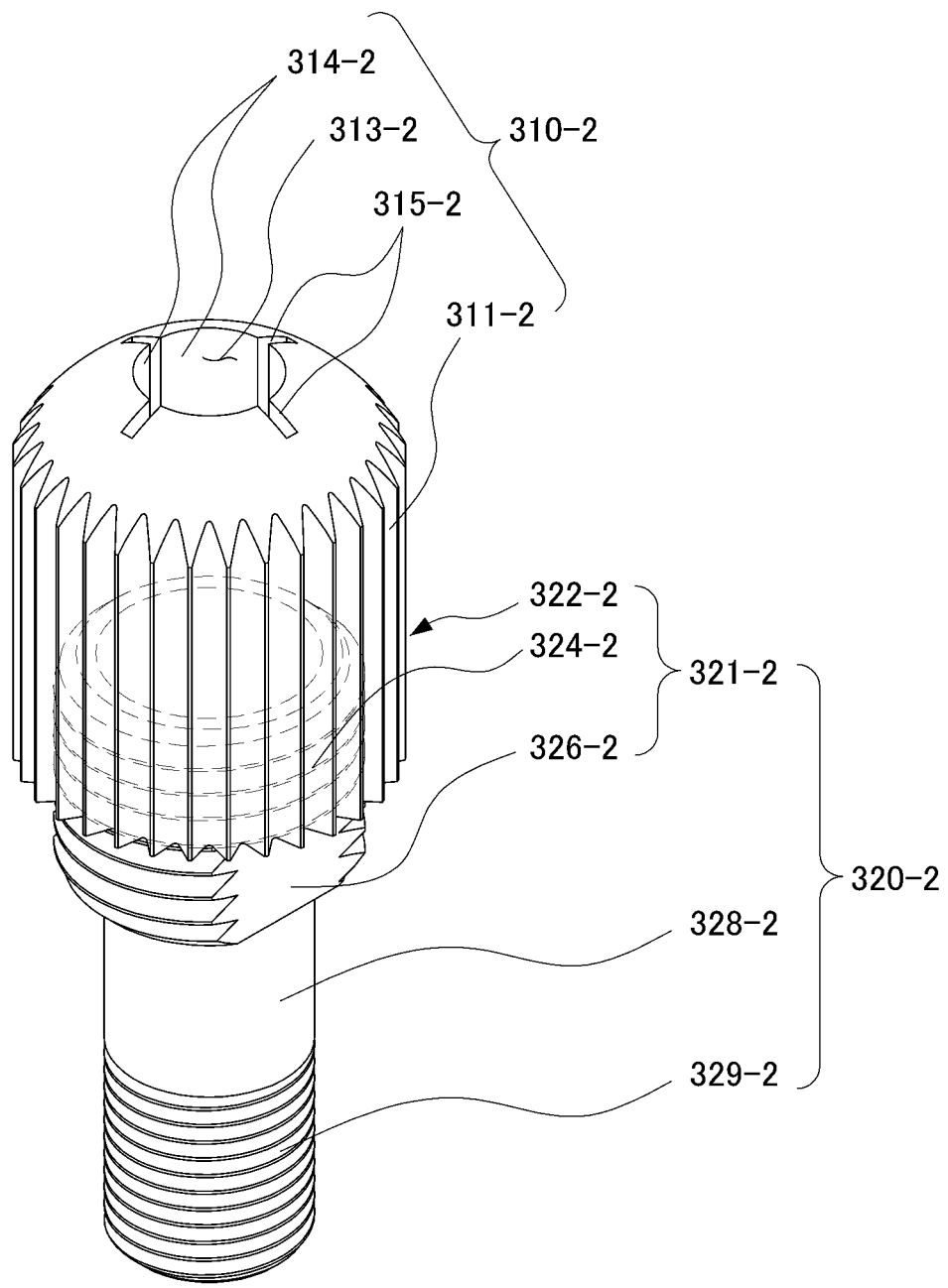
FIG. 18 is an exploded view illustrating a coupling relation of the extension rod, the controller body, and coupling body.

FIG. 17 is a perspective view illustrating a configuration in which the controller body and the coupling body are coupled to each other, and FIG. 18 is an exploded view illustrating a coupling relation of the extension rod, the controller body, and coupling body.

As illustrated in FIGS. 13 to 16, the second extension rod controller 300-2 includes a controller body 310-2 and a coupling body 320-2.

The controller body 310-2 includes a plurality of guide film 314-2 having third threads 312-2 formed at an inner circumferential surface, and a second through hole 313-2 formed at a center of on upper side surface, and extending downward a certain length along a cut portion of the second through hole to form a coupling space 316-2 between the inner circumferential surface and the plurality of guide film.

Here, gaps 315-2 are formed between the plurality of guide films 314-2.

The coupling body includes a second header 321-2 penetrated by a third through hole and a pipe portion 328-2.

The second header 321-2 includes an extension portion 322-2 having fourth threads formed at an outer circumferential surface, enabling the fourth threads to be coupled to the third threads, contracting the guide film toward an inside thereof, and coupled to the coupling space, and a neck portion connected to have a smaller diameter than the extension portion.

The pipe portion 328-2 has a pipe shape, is configured to extend from the neck portion, and has fifth threads formed on the outer circumferential surface.

Here, the fifth threads are screw-coupled to the second threads of the lifting bar, the extension rod is restricted by the inner circumferential surface of the extension portion 322-2 contracting the guide film 314-2 toward an inside thereof and the guide film and the outer circumferential surface of the extension rod being tightly in contact with each other when the coupling body is coupled to the lifting bar by the fifth threads 329-2 being coupled to the second threads 125, the extension rod 140 passes through the second through hole 313-2 to be inserted into the controller body, the coupling body, and the lifting bar, the third threads 312-2 and the fourth threads 324-2 are screw-coupled to each other, and the extension rod is capable of vertically moving when the third threads and the fourth threads are unscrewed from a screw-coupled state and the guide film expands.

When the through hole of the controller body, an inner diameter Rb-2 of the guide film, and an inner diameter Rb-2 of the coupling body are formed so that the extension rod 140 is capable of vertically moving, a cap inner diameter Rb-1 of the controller body and an outer diameter Rb-4 of an extension portion of the coupling body are formed to correspond to each other, the third threads and the fourth threads are coupled to each other, and the extension portion is coupled to the coupling space, the extension rod is restricted because an outer circumference thickness Rb-5 of the extension portion is slightly larger than a thickness of the coupling space, the outer circumference of the guide film is pressed toward an inside thereof, the guide film is contracted, and the inner circumferential surface of the contracted guide film is in contact with the extension rod.

Figure 19:
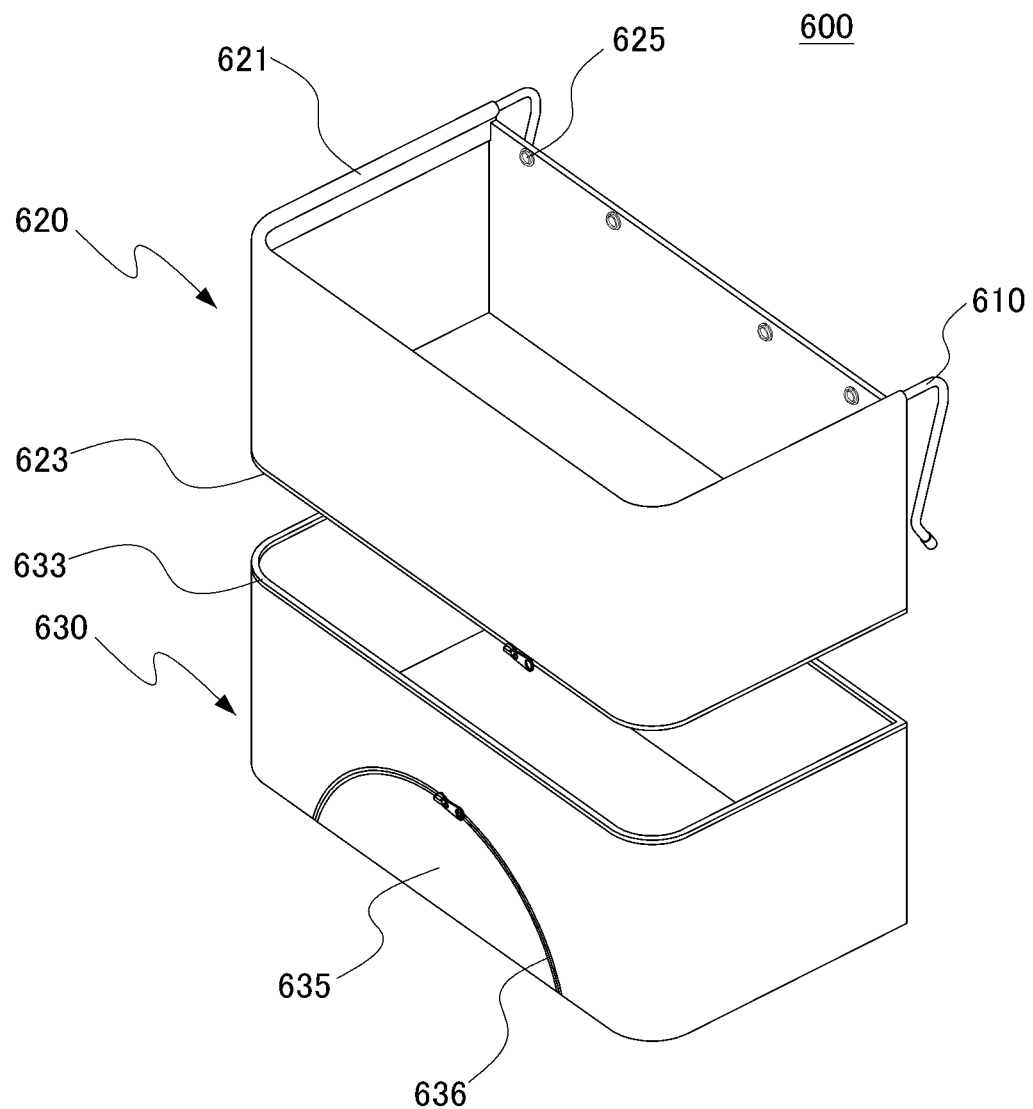
FIG. 19 is a perspective view illustrating a configuration of a storage member.
Figure 20:
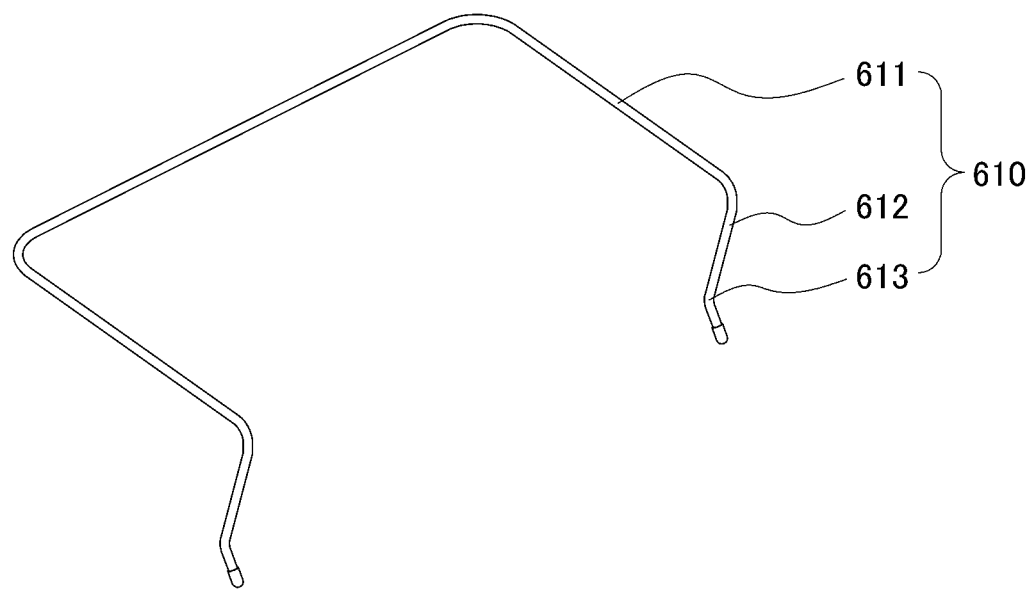
FIG. 20 is a perspective view illustrating a configuration of a storage member frame.
Figure 21:
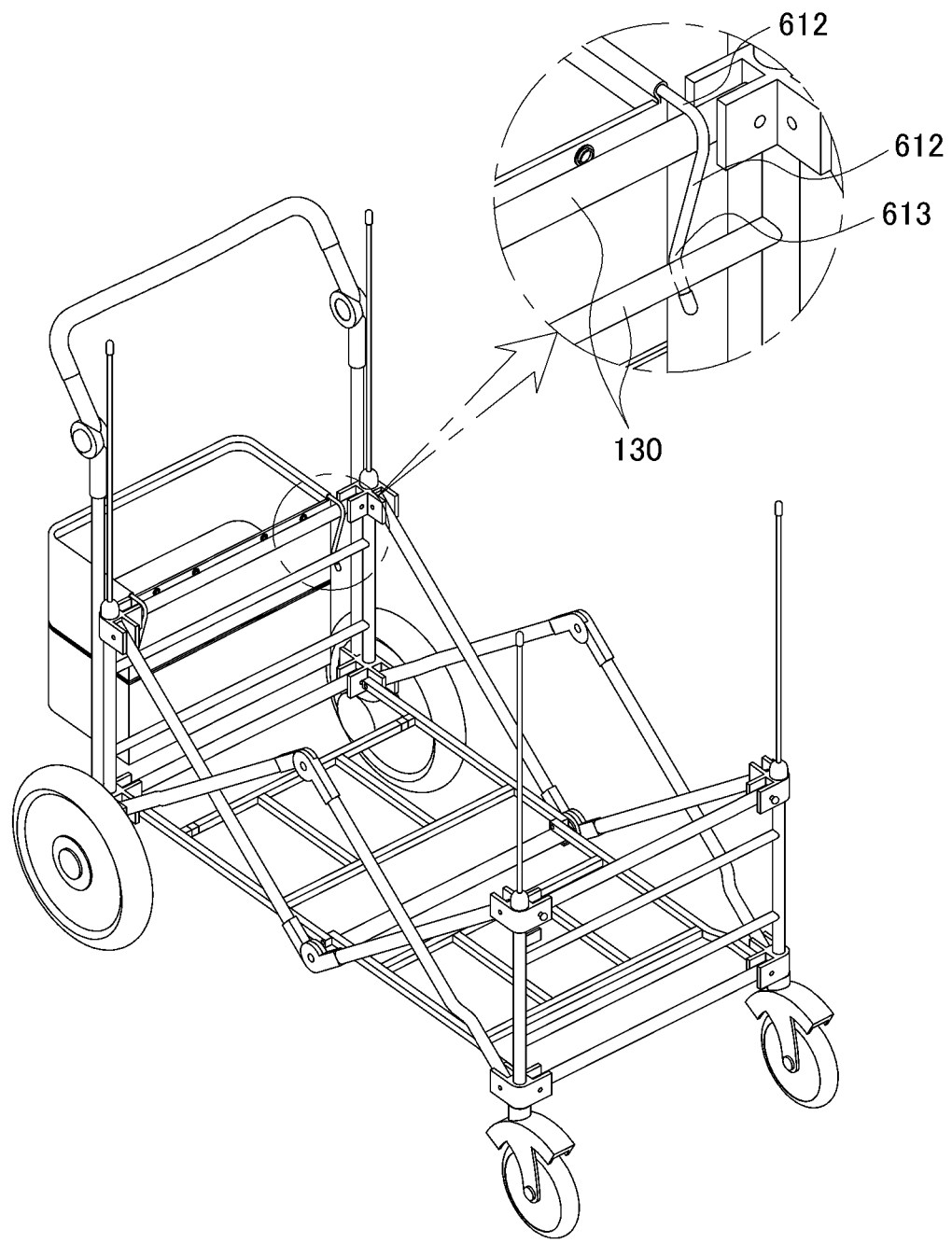
FIG. 21 is an explanation view illustrating a coupling configuration in which the storage member is detached from or attached to a horizontal bar of a support frame.
Figure 22:
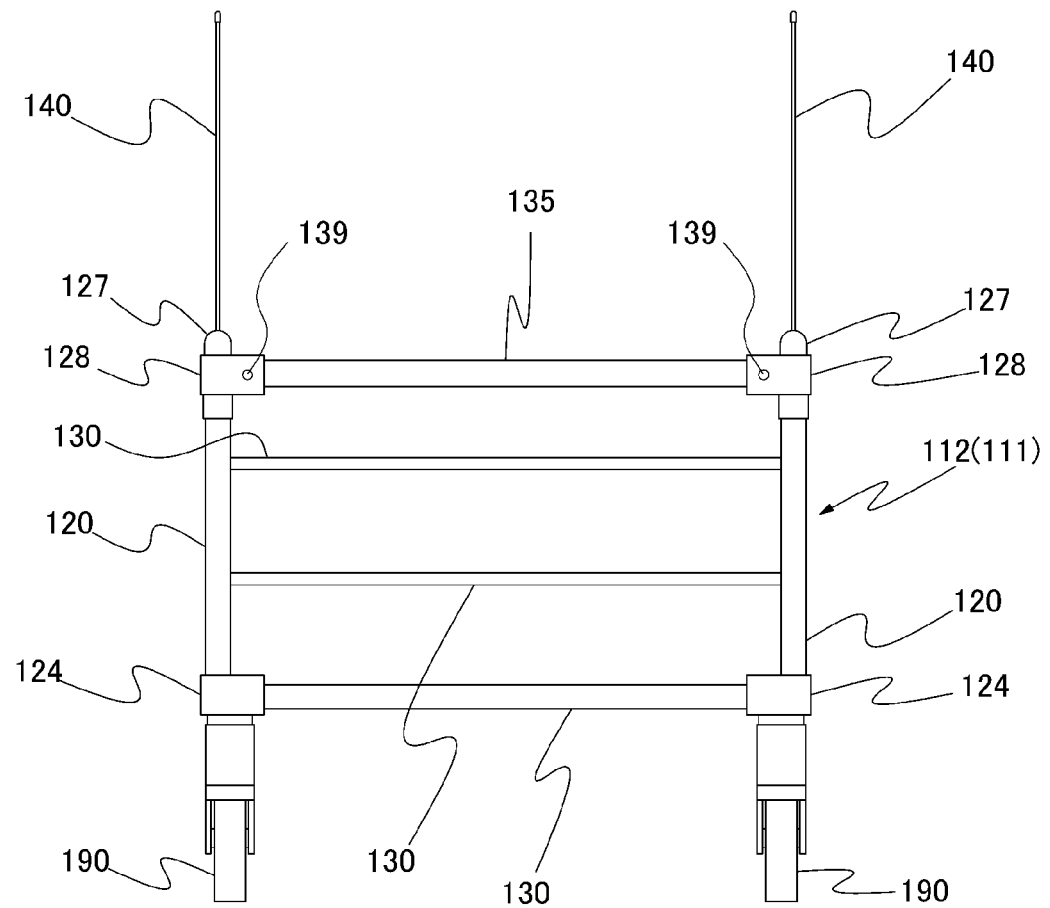
FIGS. 22 to 25 are respectively front, side, plan, and enlarged views illustrating a configuration of a support frame.
Figure 23:
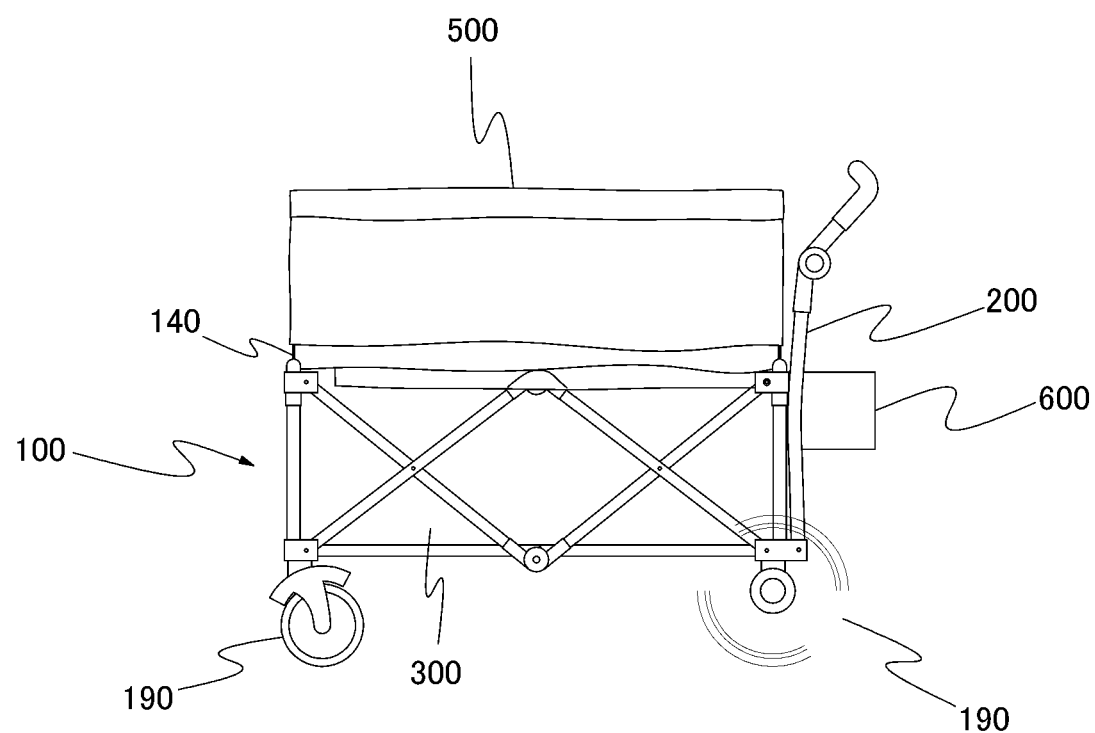
Figure 24:
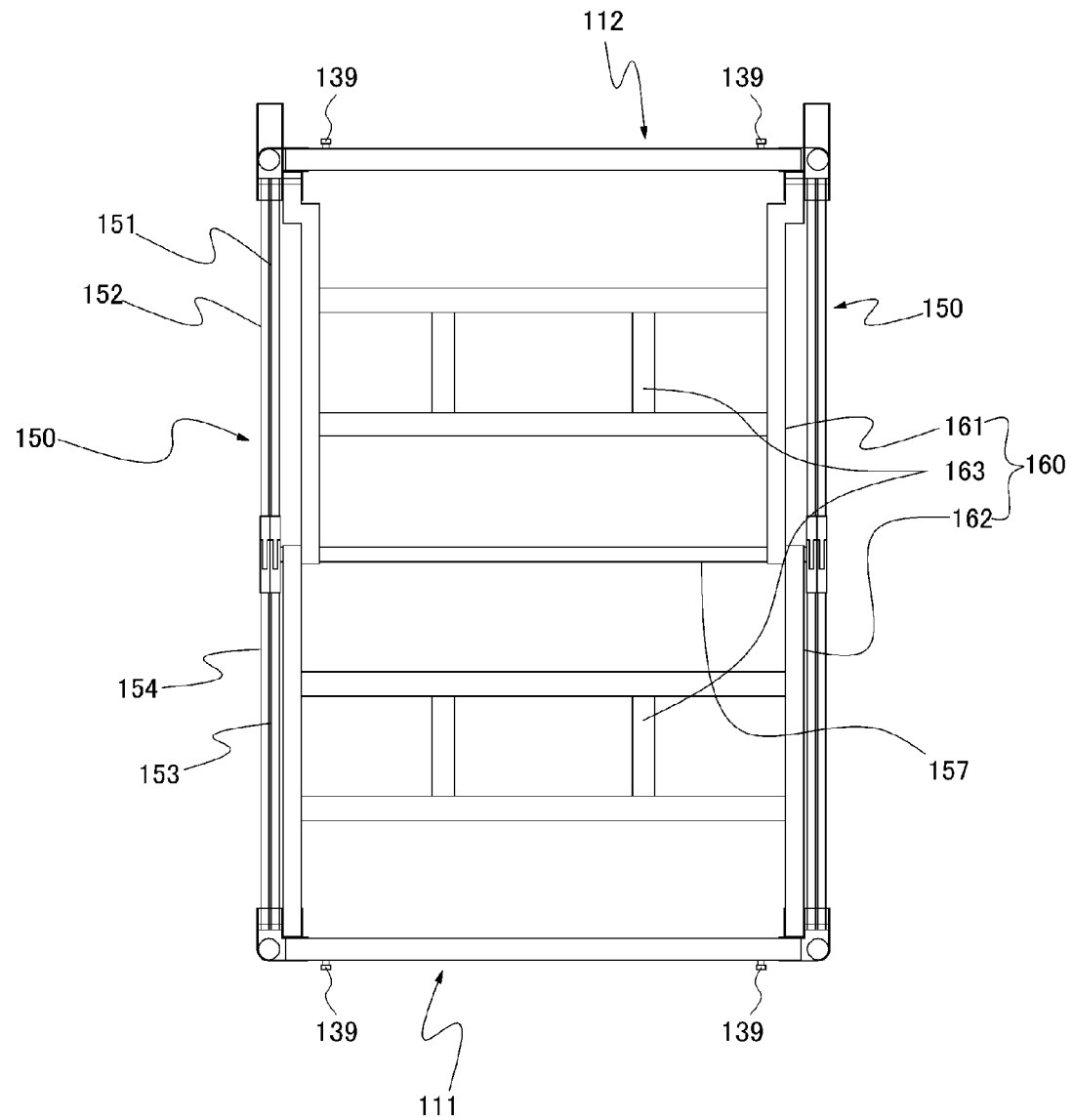

FIG. 19 is a perspective view illustrating a configuration of a storage member, FIG. 20 is a perspective view illustrating a configuration of a storage member frame, and FIG. 21 is an explanation view illustrating a coupling configuration in which a storage member is detached from and attached to a horizontal bar of a support frame.

The stroller according to the present invention further includes a storage member 600.

The storage member 600 includes an upper side edge portion 611, a storage member frame 610 having two or more vertical coupling portions 612 having bending portions 613 configured to extend downward from one side of the upper side edge portion 611 and having lower end portions bent toward other sides thereof, a first storage portion 620 having a storage space formed in an inside and an opened upper side edge coupled to the upper side edge portion 611, and a second storage portion 630 in which the opened upper side edge is detached from or attached to a lower side edge of the first storage portion in a zipper-coupling manner.

Here, the two or more horizontal bars 130 of the one-side support are provided from upper portions to lower portions of the pair of vertical bars of the one-side support at predetermined intervals.

That is, the storage member 600 is coupled to the horizontal bar of the one-side support so that the horizontal bar 130 of the one-side support 111 is disposed between the vertical coupling portion 612 and an upper end of the upper side edge portion 611, and the vertical coupling portion 612 is detached from and attached to the two horizontal bars 130 by the bending portion 613 intersecting the two horizontal bars 130 (refer to FIG. 21).

It is preferable that coupling buttons 625 coupled to the coupling buttons 421 formed at the horizontal bar coupling portion 420 of the inner sheet in a snap button manner be further formed at an upper end of a rear side surface of the first storage portion 620.

A first zipper 623 and a second zipper 633 are formed respectively at an lower end edge of the first storage portion 620 and an upper end edge of the second storage portion 630, and the first storage portion and the second storage portion are detached from and attached to each other in a zipper manner.

A third zipper 636 is further formed and an accommodating portion 635 in which a front side portion of the second storage portion is opened or closed according to a movement of the third zipper is further formed at a front side surface of the second storage portion 630.

That is, shoes and the like may be put through the accommodating portion for storage.

Next, a configuration of the support frame 100 configured to be folded in a folding manner and coupling relations between elements will be described in detail.

Figure 25:
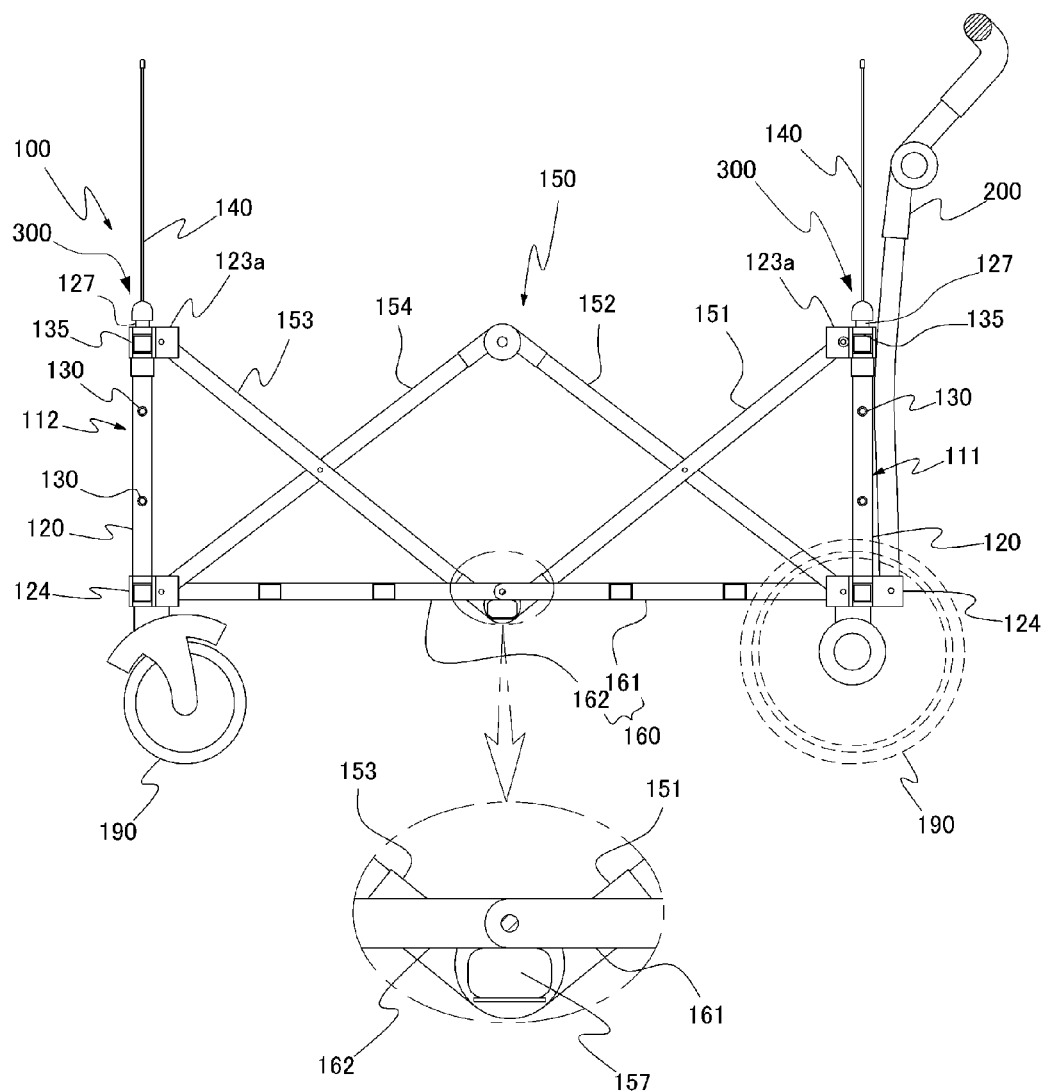
Figure 26:
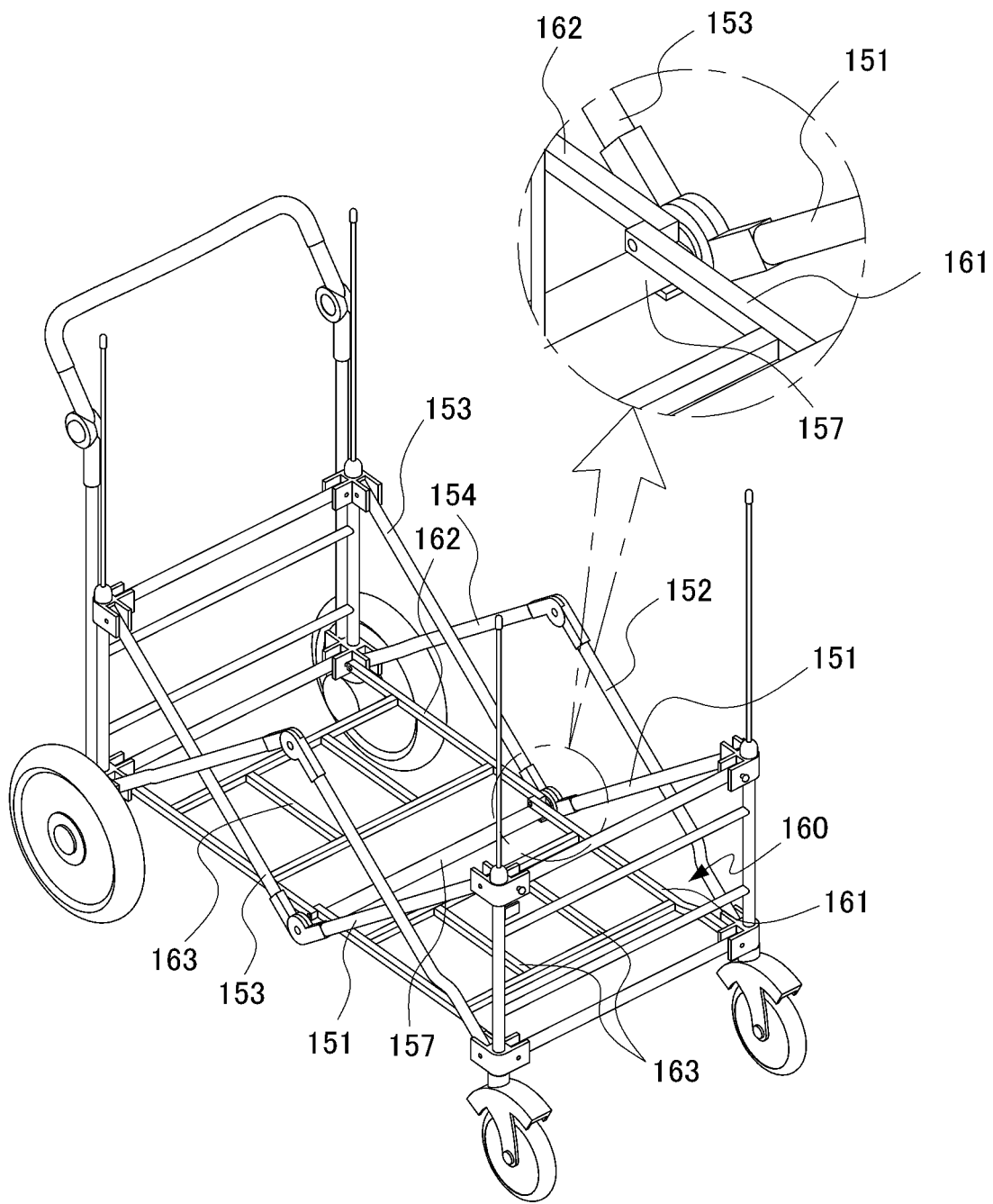
FIGS. 26 and 27 are plan and bottom perspective views illustrating a configuration of a bottom support.
Figure 27:
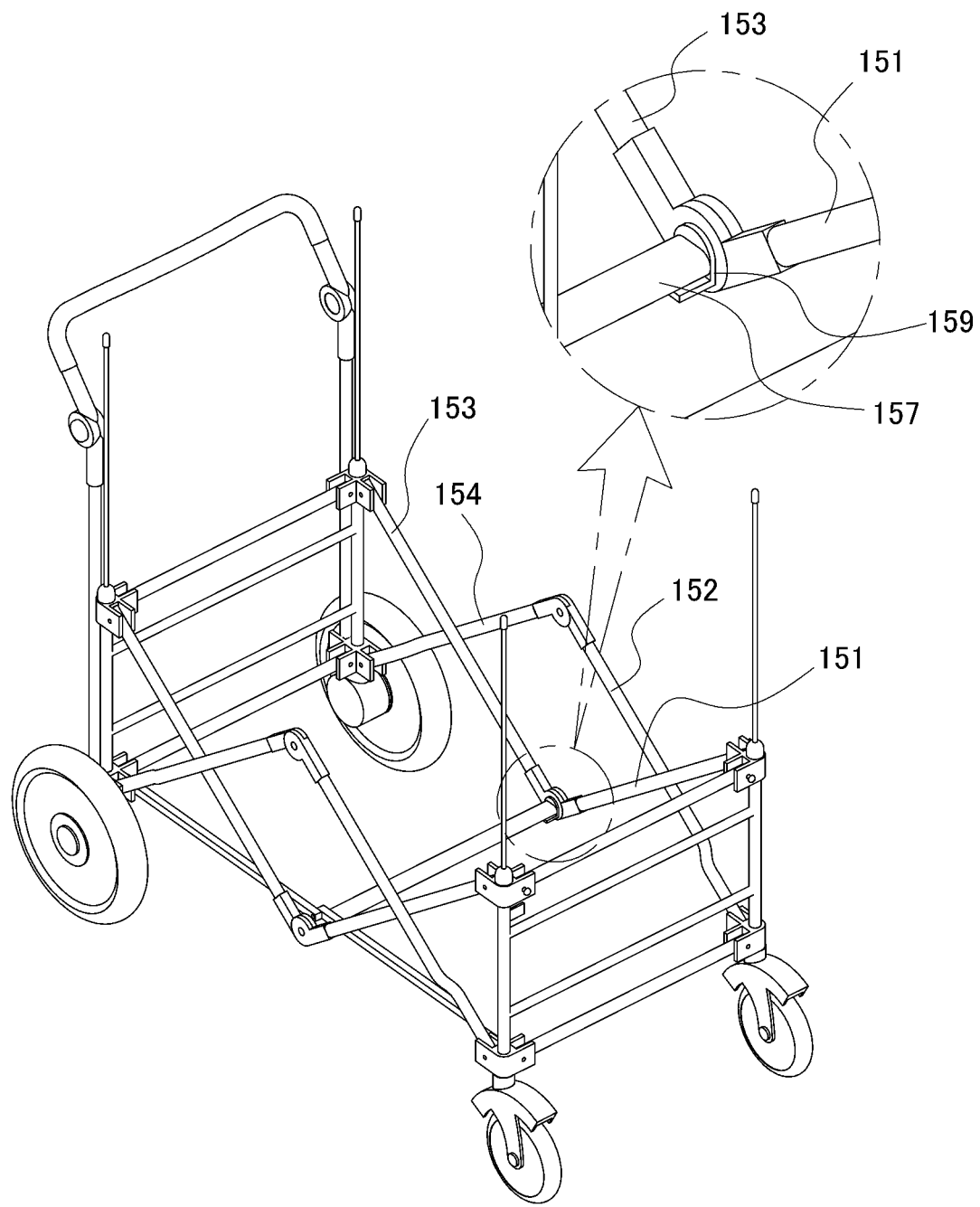
Figure 28:
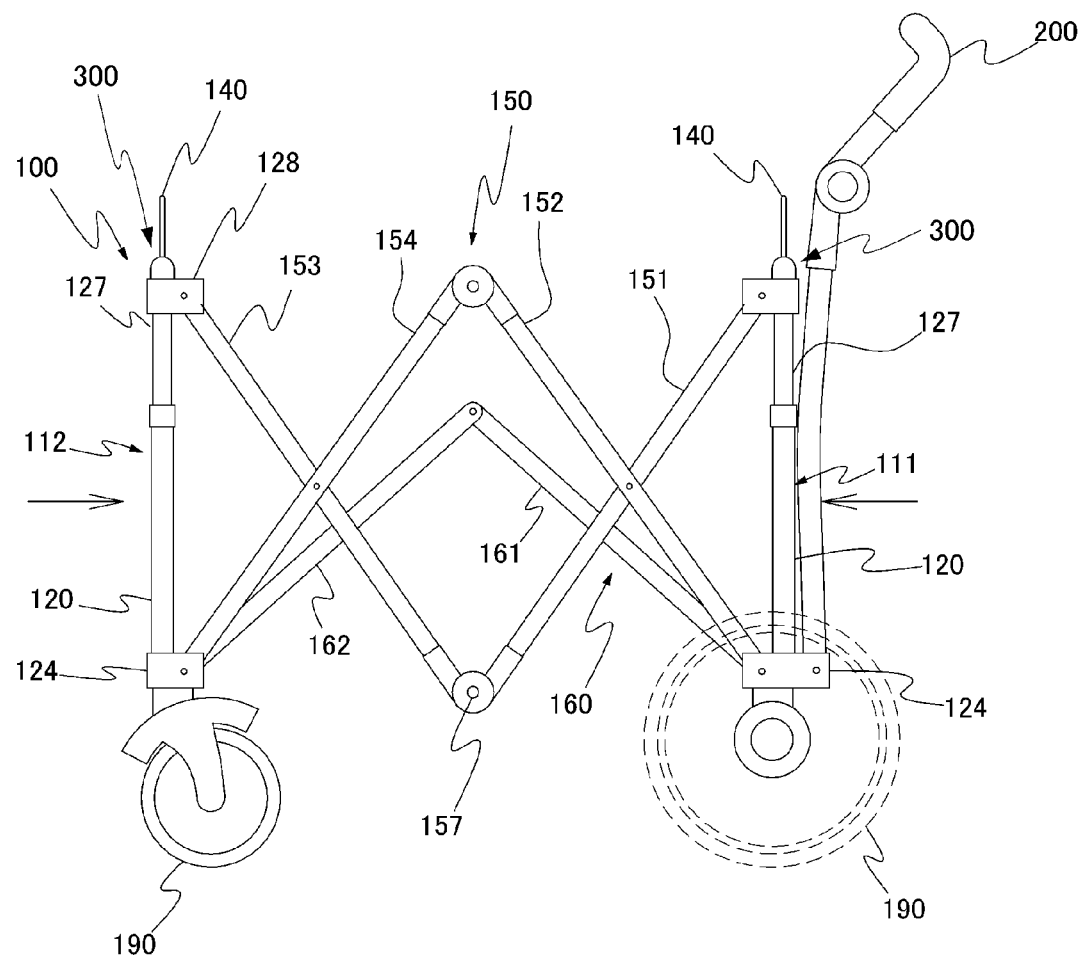
FIGS. 28 to 30 are reference views illustrating a process in which a support frame of a stroller according to the present invention is folded or unfolded.
Figure 29:
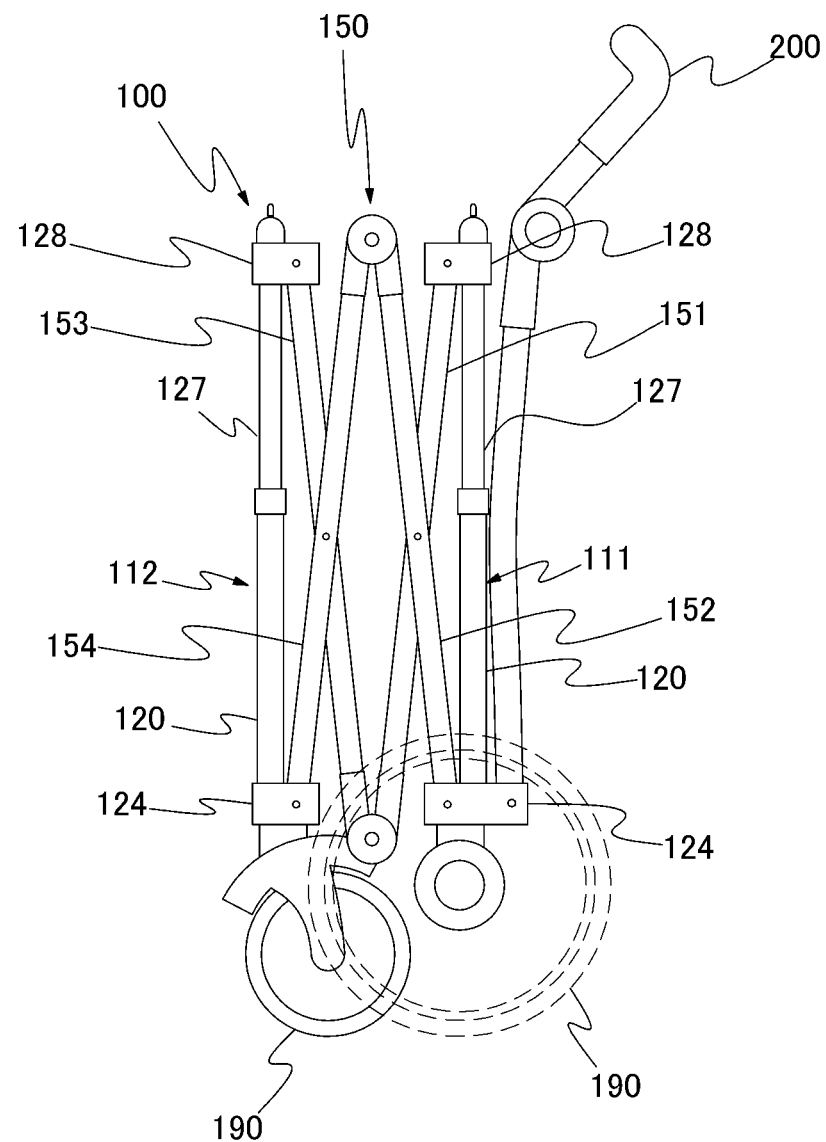
Figure 30:
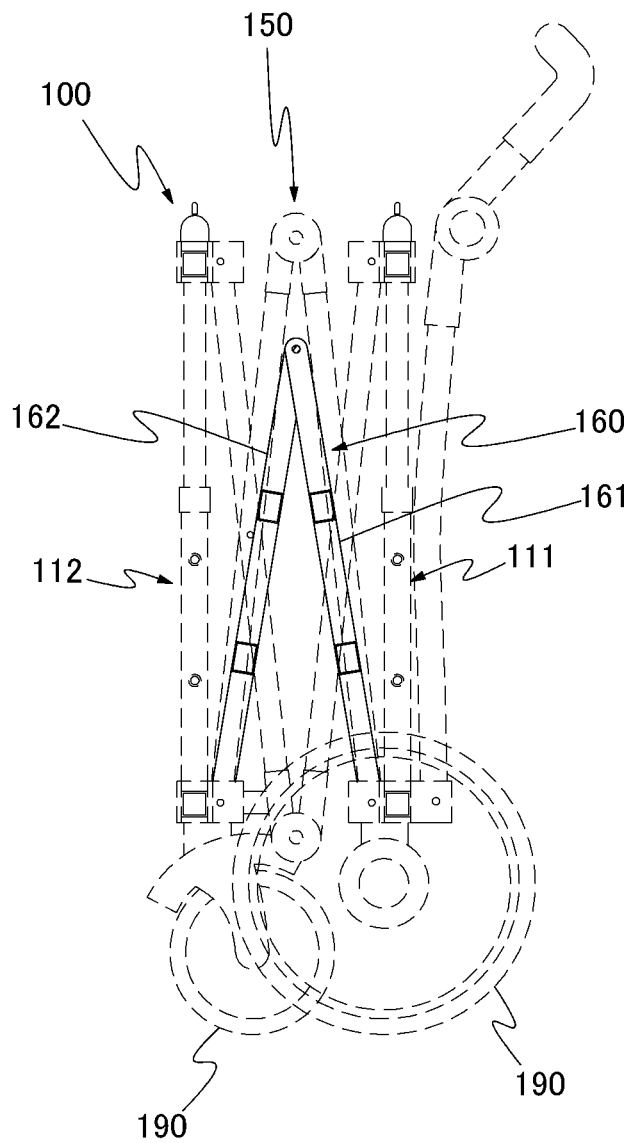
Figure 31:
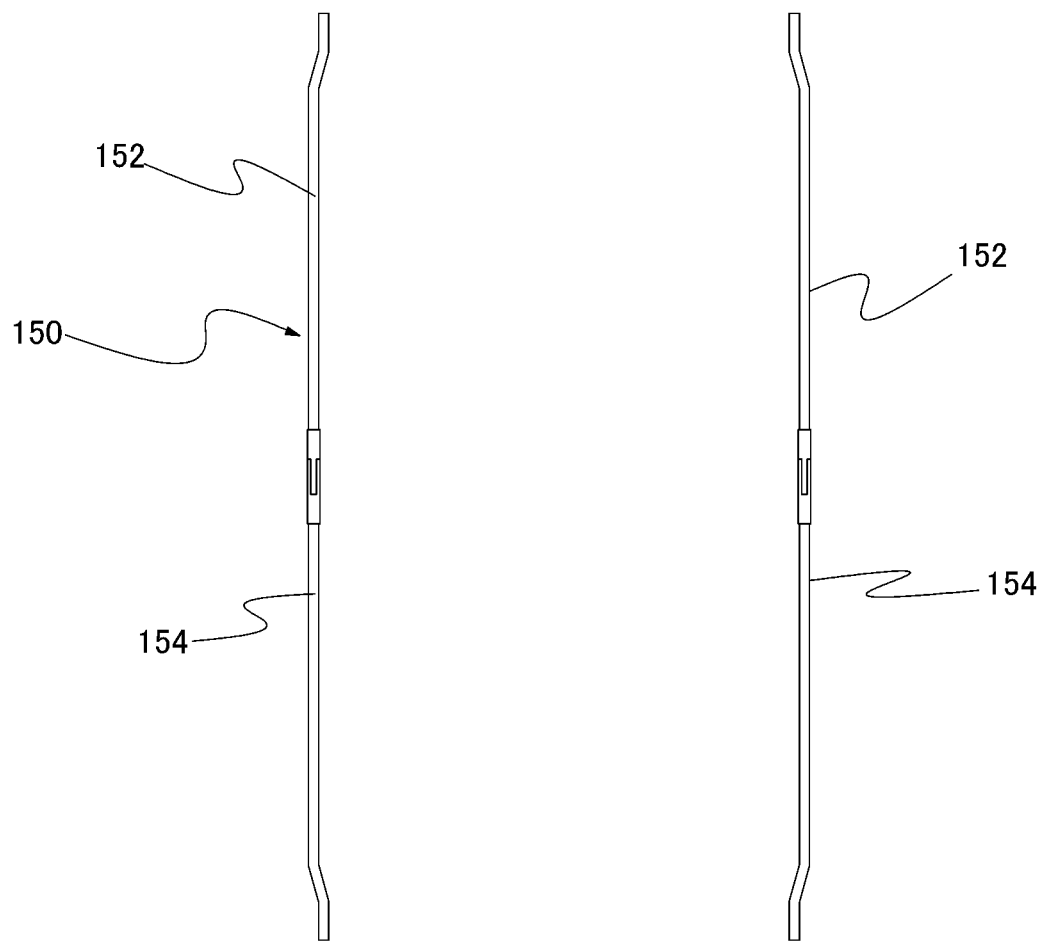
FIG. 31 is a plan view illustrating a coupling configuration of a first support bar to a fourth support bar.
Figure 32:
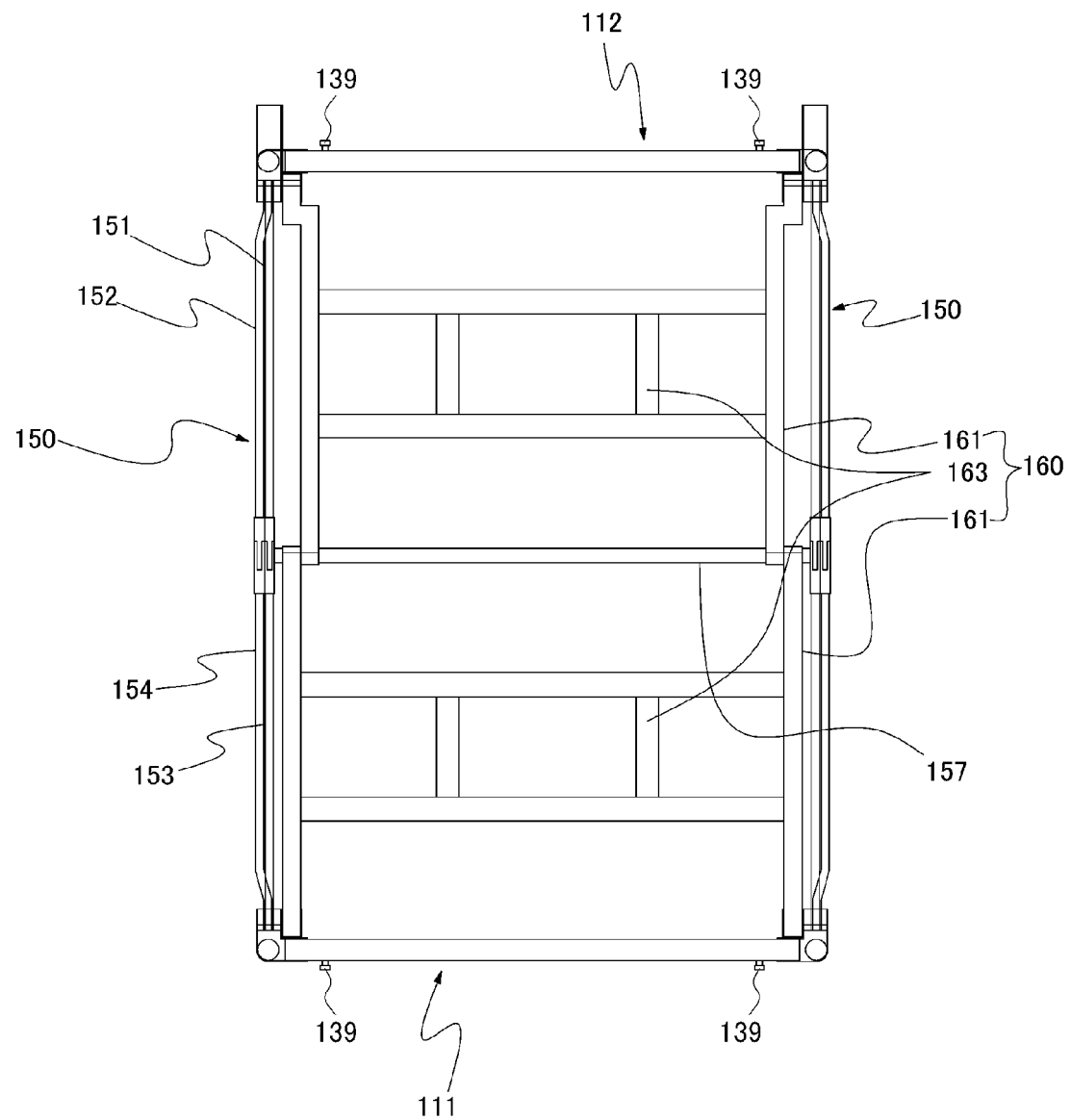
FIG. 32 is a plan view illustrating a configuration of a support frame.

FIGS. 22 to 25 are respectively a front view, a side view, a plan view, and an enlarged side view illustrating a configuration of a support frame, FIGS. 26 and 27 are a plan view and a perspective view of a bottom portion illustrating a configuration of a bottom support, FIGS. 28 to 30 are reference views illustrating a process in which a support frame of a stroller according to the present invention is folded or unfolded, FIG. 31 is a plan view illustrating a coupling configuration of a first support bar to a fourth support bar, and FIG. 32 is a plan view illustrating a configuration of a support frame.

Each of the vertical bars 120 includes the lifting bar 127 which moves into or out of an upper end of the vertical bar in a telescopic manner and is coupled to the upper bracket 128 at an upper end thereof.

Here, a lower bracket 124 is coupled to a lower end portion of the vertical bar.

The side support includes a first support bar 151 having one end portion coupled to the upper bracket 128 of the one-side support 111 in a vertically pivotable manner and disposed to be extendable in the other side lower direction, a second support bar 152 having one end portion coupled to the lower bracket 124 of the one-side support 111 in a vertically pivotable manner, disposed to be extendable in the other side upper direction, and having a middle portion intersected by and hinge-coupled to the first support bar 151 in a mutually pivotable manner, a third support bar 153 having one end portion hinge-coupled to the other end portion of the first support bar 151 in a vertically pivotable manner and having the other end portion hinge-coupled to the upper bracket 128 of the other-side support 112, and a fourth support bar 154 having one end portion hinge-coupled to the other end portion of the second support bar 152 in a vertically pivotable manner, having the other end portion hinge-coupled to the lower bracket 124 of the other-side support 112, and having a middle portion intersected by and hinge-coupled to the third support bar 153 in a mutually pivotable manner.

The bottom support 160 includes a pair of frame members having first frame members 161 with one ends hinge-coupled to the lower brackets of the one-side support in a pivotable manner and second frame members 162 with one ends hinge-coupled to the other ends of the first frame members in a pivotable manner and the other ends hinge-coupled to the lower brackets of the other-side support in a pivotable manner, and third frame members 163 connected between the first frame members and the second frame members in one direction, the other direction and a width direction. Thus, the one ends of the first frame members and the other ends of the second frame members are pivoted and lifted when the one-side support and the other-side support are adjacent to each other, and the first frame members and the second frame members are lowered in parallel when the one-side support and the other-side support are spaced apart from each other.

Here, in each of lower sides of hinge-couple portions in which a pair of the other end of the first support bar and the one end of the third support bar are hinge-coupled, a support bar holder 159 is coupled at a lower side thereof, and a support bar 157 having one end and the other end coupled to the support bar holders 159 is included, as illustrated in FIGS. 25 and 26.

Here, the support bar 157 stably supports a normal force loaded from an upper side of the bottom support by supporting the first and second frame members 161 and 162 included in the bottom support from a lower side to an upper side in a state in which the one-side support and the other-side support are spaced apart from each other and the bottom support 160 is unfolded in parallel with the surface of the earth.

A handle 200 may be coupled to the one-side support 111 or the other-side support 112.

The handle 200 is provided in a shape in which a bar member is bent into a U shape, and both ends thereof are hinge-coupled to the lower brackets 124 of the one-side support 111 in a vertically pivotable manner.

Here, a fixing unit (not shown) is provided at the handle 200, and tightly contacts and fixes the handle 200 to the one-side support 111, or unlocks a lock state of the fixing unit so that a user may pivot the handle 200 forward.

Figure 33:
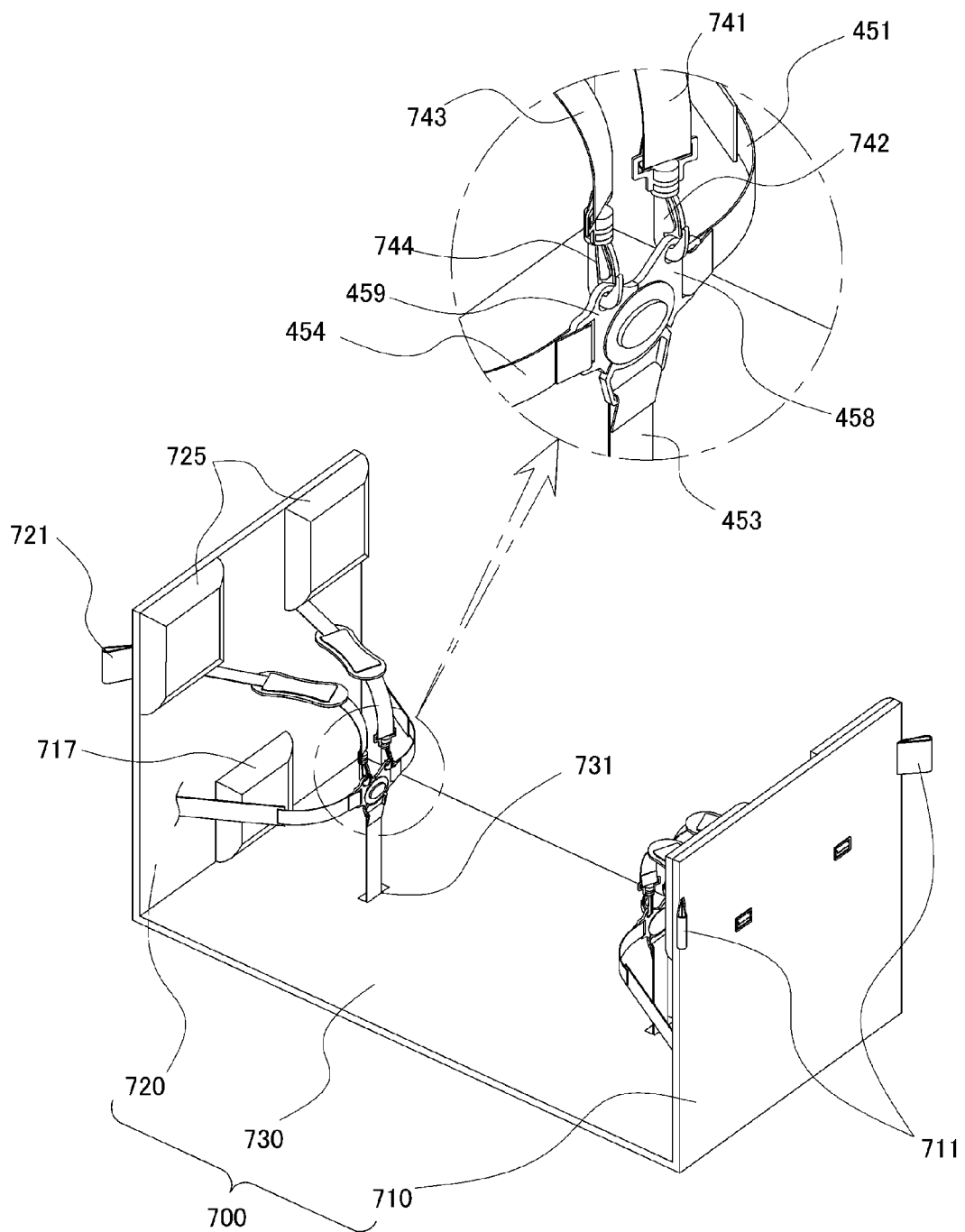
FIG. 33 is a perspective view illustrating a configuration of a pad.
Figure 34:
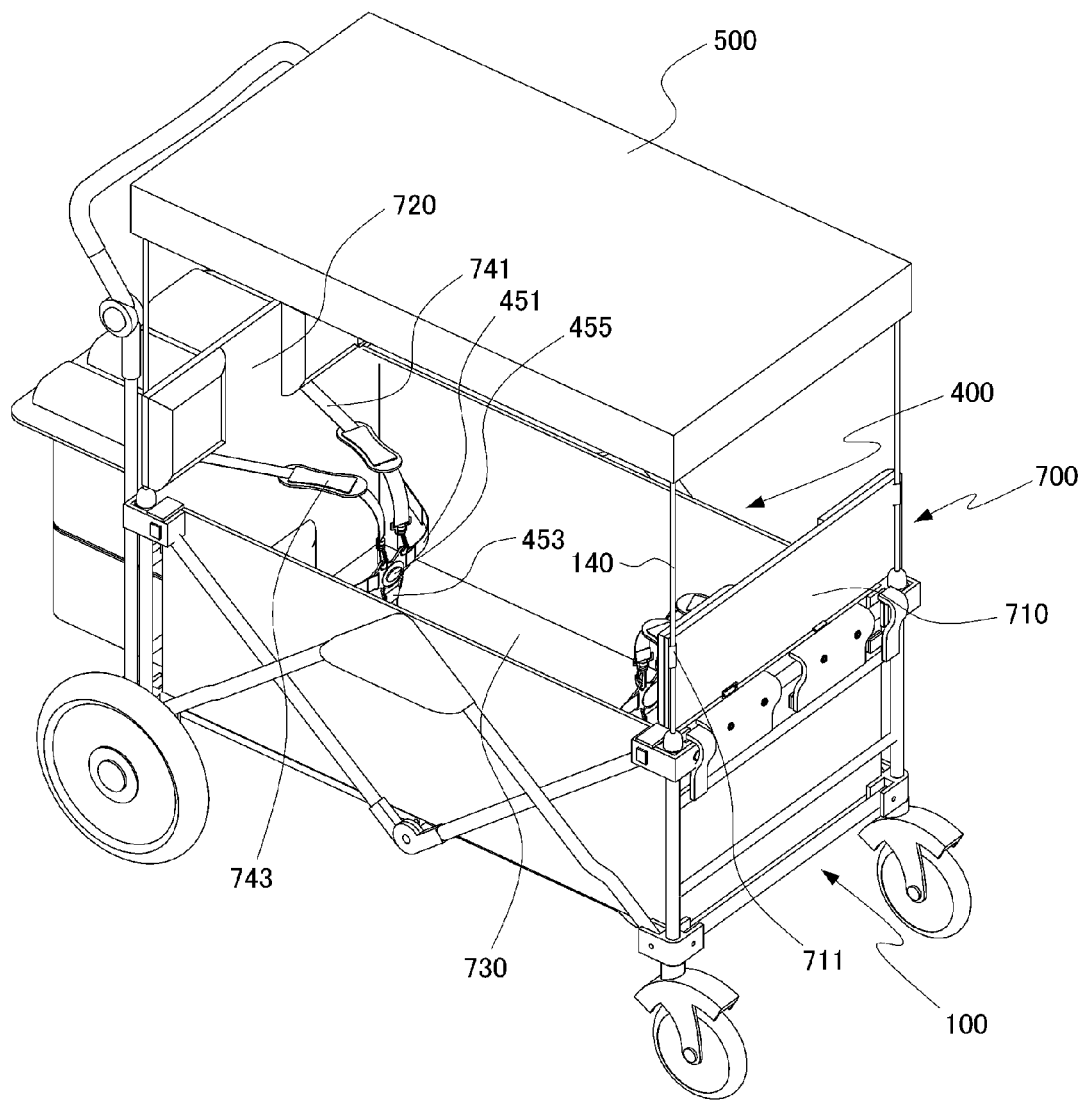
FIG. 34 is a perspective view illustrating a total configuration of a state in which an inner sheet, a sun cover, and a pad are coupled to a support frame.

FIG. 33 is a perspective view illustrating a configuration of a pad, and FIG. 34 is a perspective view illustrating a total configuration of a state in which an inner sheet, a sun cover, and a pad are coupled to a support frame.

The stroller according to the present invention further includes a pad 700 that detaches from or attaches to an upper side surface of the inner sheet 400 accommodated inside the support frame 100 in a tight contact manner.

The pad 700 is coupled to an upper side of the inner sheet 400 after the inner sheet 400 is accommodated in the support frame 100 to improve riding quality and safety of a child riding in the stroller.

The pad 700 is formed to be accommodated in an internal space of the support frame in tight contact with an inner side of the one-side support, the other-side support, and the bottom support.

That is, the pad 700 includes a one-side pad surface 710 and an other-side pad surface 720 respectively corresponding to the one-side support and the other-side support, and a bottom pad surface 730 configured to connect the one-side pad surface 710 and the other-side pad surface 720 to correspond to the bottom support.

Here, a cut portion 711 through which the third belt 453 of the safety belt 450 configured to pass is formed in one side or both sides of the one side and the other side of the bottom pad surface.

That is, the safety belt 450 formed in a bottom surface of the inner sheet protrudes from an upper side of a bottom surface of the pad 700 through the cut portion 711, and the first belt 451 and the second belt 454 of the safety belt 450 are directly connected from the inner sheet to the pad.

Here, a first upper-side belt 741 and a second upper-side belt 743 configured to be respectively coupled to or decoupled from the first belt and the second belt in a clipping manner are provided in one or both of the one-side pad surface and the other-side pad surface of the pad 700.

The first upper-side belt 741 and the second upper-side belt 743 are respectively connected to the first belt and the second belt of the safety belt 450 and stably support both shoulders of a child riding in the stroller to improve safety of the stroller.

Here, a first clip 742 and a second clip 744 configured to be respectively clip-coupled to the first belt and the second belt are coupled to the first upper-side belt 741 and the second upper-side belt 743, and clip coupling holes 458 and 459 are formed in portions in which the buckle 455 is coupled in the first belt 451 and the second belt 454. Here, the thighs on both sides of the crotch of a child riding in the stroller are supported by coupling the first belt, the second belt, and the third belt to the buckle, and both shoulders of the child riding in the stroller are simultaneously supported by respectively coupling the first upper-side belt and the second upper-side belt to a buckle-coupling portion of the first belt and a buckle-coupling portion of the second belt.

Head supports 715 and 725 configured to prevent the head of a child riding in the stroller from rolling left or right are formed in one or both of the one-side pad surface 710 and the other-side pad surface 720 of the pad 700.

The head supports prevent the head of a child from rolling left and right by protruding in a shape in which cushions are symmetrically formed at both sides based on a position at which the head of the child riding in the stroller is located.

In addition, waist supports 717 and 727 configured to support the waist of the child riding in the stroller are formed on one or all of the one-side pad surface 710 and the other-side pad surface 720 of the pad 700 so that the child can conveniently ride in the stroller with correct posture.

Extension rod through portions 711 and 721 through which the extension rods 140 respectively pass at both sides of the one-side pad surface and the other-side pad surface of the pad 700 are formed.

That is, the pad is coupled to the support frame, specifically, the upper side of the inner sheet accommodated in the support frame, by the extension rod passing through the extension rod through portion.

Convenience in use of the pad is greatly improved by the pad being coupled or decoupled by passing the extension rod through the extension-rod-through portion.

Luminous reflective strips 719 and 729 (not shown) configured to emit light corresponding to incident light from outside are formed on one or both of the one-side pad surface 710 and the other-side pad surface 720 of the pad 700 to be easily distinguishable from surroundings during night strolling.

As described above, the stroller, a folding function of which can be easily and conveniently performed to greatly improve convenience of use, and in which stability and easy and quick installation and uninstallation of a sun cover are guaranteed and there is no the need to uninstall the sun cover even when the stroller is folded can be provided according to the present invention.

A stroller in which a moving in and out function of the extension rods is easily performed and a manufacturing cost is reduced can also be provided according to the present invention.

In addition, a stroller in which usability is maximized by allowing the inner sheet to be easily coupled or decoupled and allowing the storage portion configured to accommodate goods to be conveniently coupled or decoupled can be provided according to the present invention.

It will be understood by those skilled in the art that the invention may be performed in other concrete forms without changing the technological scope and essential features. Therefore, the above-described examples should be considered in a descriptive sense only and not for purposes of limitation. The scope of the present invention is defined not by the detailed description but by the appended claims. All modifications and equivalents that fall within the scope of the appended claims will be construed as being included in the present invention.

What is claimed is:
1. A stroller comprising:
   a support frame including
   a pair of vertical bars, lengths which are vertically controllable in a telescopic manner, and provided to be spaced apart from each other,
   a one-side support and an other-side support, respectively disposed at one side and an other side, to include horizontal bars each having both ends connected to the pair of vertical bars to support the pair of vertical bars, and
   side supports and a bottom support configured to connect the one-side support and the other-side support to form a square frame shape having an upper side opened with the one-side support and the other-side support, and form side frames and a bottom frame,
   wherein the side supports and the bottom support enable the one-side support and the other-side support to be adjacent to or spaced apart from each other in a folding manner in conjunction with lifting or lowering of the vertical bars;
   extension rods respectively coupled to the vertical bars to be capable of vertically moving into or out of upper ends of the vertical bars;
   safety belts;
   an inner sheet formed in a shape corresponding to an internal space of the support frame to be accommodated in the internal space of the support frame, having one or both of one side and the other side coupled to the safety belts, and having coupling portions detachably coupled to the horizontal bars and the side supports at an upper end circumference thereof;
   detachable members detachably coupled to the extension rods; and
   a sun cover coupled to the detachable members, integrally detached from and attached to the extension rods according to detachment and attachment of the detachable members from and to the extension rods, and configured to cover an upper side portion of the support frame,
   wherein each of the vertical bars comprises a lifting bar configured to move into or out of an upper end of the vertical bar in a telescopic manner, having an upper end which has a cylindrical shape in which an upper side is opened, and having an inner circumferential surface which has second threads, and an extension rod controller configured to allow a respective one of the extension rods to vertically move in or out, or to be fixed and coupled to and restricted by the lifting bar, and the extension rod controller comprises a first extension rod controller or a second extension rod controller,
   wherein the first extension rod controller comprises
   a first header having a first through hole configured to vertically pass therethrough; and
   an expansion-contraction portion having one or more cut portions configured to extend downward from the first header, having first threads capable of being coupled to the second threads on an outer circumferential surface thereof, and having a lower end portion cut toward an upper side thereof, and
   wherein the extension rod is restricted by the expansion-contraction portion being contracted toward an inside and being in tight contact with an outer circumferential surface of the extension rod when the extension rod vertically passes through the first header and the expansion-contraction portion and the first threads and the second threads are screw-coupled to each other, and
   further wherein the extension rod is capable of vertically moving when the first threads and the second threads are unscrewed from a screw-coupled state and the expansion-contraction portion expands, and wherein the second extension rod controller comprises:

a controller body having third threads formed at an inner circumferential surface, having a second through hole formed at a center of an upper side surface, including a plurality of guide films extending downward a certain length along a cut portion of the second through hole to form a coupling space between the inner circumferential surface of the controller body of the second extension rod controller and the plurality of guide films, and including a cap in which gaps are formed between the plurality of guide films; and a coupling body including a second header which has an extension portion having fourth threads formed at an outer circumferential surface, enabling the fourth threads to be coupled to the third threads, contracting the guide films toward an inside thereof, and coupled to the coupling space, a neck portion connected to have a smaller diameter than the extension portion, and a pipe portion configured to extend from the neck portion, having fifth threads formed on outer circumferential surface, configured to be screw-coupled to the second threads of the lifting bar, and having a pipe shape, and wherein the extension rod is restricted by the inner circumferential surface of the extension portion contracting the guide films toward an inside thereof and the guide films and the outer circumferential surface of the extension rod being tightly in contact with each other when the coupling body is coupled to the lifting bar by the fifth threads being coupled to the second threads, the extension rod passes through the second through hole to be inserted into the controller body, the coupling body, and the lifting bar, the third threads and the fourth threads are screw-coupled to each other, and the extension rod is capable of vertically moving when the third threads and the fourth threads are unscrewed from a screw-coupled state and the guide films expand.

2. A stroller comprising:

a support frame including
- a pair of vertical bars, lengths which are vertically controllable in a telescopic manner, and provided to be spaced apart from each other,
- a one-side support and an other-side support, respectively disposed at one side and an other side, to include horizontal bars each having both ends connected to the pair of vertical bars to support the pair of vertical bars, and
- side supports and a bottom support configured to connect the one-side support and the other-side support to form a square frame shape having an upper side opened with the one-side support and the other-side support, and form side frames and a bottom frame,
- wherein the side supports and the bottom support enable the one-side support and the other-side support to be adjacent to or spaced apart from each other in a folding manner in conjunction with lifting or lowering of the vertical bars;

extension rods respectively coupled to the vertical bars to be capable of vertically moving into or out of upper ends of the vertical bars;

safety belts;

an inner sheet formed in a shape corresponding to an internal space of the support frame to be accommodated in the internal space of the support frame, having one or both of one side and the other side coupled to the safety belts, and having coupling portions detachably coupled to the horizontal bars and the side supports at an upper end circumference thereof;

detachable members detachably coupled to the extension rods;

a sun cover coupled to the detachable members, integrally detached from and attached to the extension rods according to detachment and attachment of the detachable members from and to the extension rods, and configured to cover an upper side portion of the support frame; and a storage member including:

a storage member frame having an upper side edge portion, two or more vertical coupling portions having bending portions configured to extend downward from one side of the upper side edge portion and having lower end portions bent toward other sides thereof;

a first storage portion having a storage space formed in an inside thereof and an opened upper side edge coupled to the upper side edge portion; and a second storage portion in which the opened upper side edge is detached from or attached to a lower side edge of the first storage portion in a zipper-coupling manner, wherein two or more horizontal bars of the horizontal bars of the one-side support are provided from upper portions to lower portions of the pair of vertical bars, which are connected to the one-side support, at predetermined intervals, and wherein the storage member is coupled to the horizontal bars of the one-side support so that the horizontal bars of the one-side support are disposed between the vertical coupling portions and an upper end of the upper side edge and the vertical coupling portions are detached from and attached to the two or more horizontal bars by the bending portions intersecting the two or more horizontal bars.

3. A stroller comprising:

a support frame including
- a pair of vertical bars, lengths which are vertically controllable in a telescopic manner, and provided to be spaced apart from each other,
- a one-side support and an other-side support, respectively disposed at one side and an other side, to include horizontal bars each having both ends connected to the pair of vertical bars to support the pair of vertical bars, and
- side supports and a bottom support configured to connect the one-side support and the other-side support to form a square frame shape having an upper side opened with the one-side support and the other-side support, and form side frames and a bottom frame,
- wherein the side supports and the bottom support enable the one-side support and the other-side support to be adjacent to or spaced apart from each other in a folding manner in conjunction with lifting or lowering of the vertical bars;

extension rods respectively coupled to the vertical bars to be capable of vertically moving into or out of upper ends of the vertical bars;

safety belts;

an inner sheet formed in a shape corresponding to an internal space of the support frame to be accommodated in the internal space of the support frame, having one or both of one side and the other side coupled to the safety belts, and having coupling portions detachably coupled to the horizontal bars and the side supports at an upper end circumference thereof;

detachable members detachably coupled to the extension rods;

a sun cover coupled to the detachable members, integrally detached from and attached to the extension rods according to detachment and attachment of the detachable members from and to the extension rods, and configured to cover an upper side portion of the support frame;

upper brackets; and lower brackets, wherein each of the vertical bars comprises a lifting bar configured to move into or out of an upper end of the vertical bars in a telescopic manner and having an upper end coupled to a respective one of the upper brackets and a lower end portion coupled to a respective one of the lower brackets, wherein the side supports comprise
- a first support bar having one end portion coupled to a first of the upper brackets, which is coupled to of the one-side support in a vertically pivotable manner and disposed to be extendable downward toward the other side,
- a second support bar having one end portion coupled to a first of the lower brackets, which is coupled to of the one-side support in a vertically pivotable manner, disposed to be extendable upward toward the other side, and having a middle portion intersected by and hinge-coupled to the first support bar in a mutually pivotable manner,
- a third support bar having one end portion hinge-coupled to the other end portion of the first support bar in a vertically pivotable manner and having the other end portion hinge-coupled to a second of the upper brackets, which is coupled to the other-side support, and
- a fourth support bar having one end portion hinge-coupled to the other end portion of the second support bar in a vertically pivotable manner, having the other end portion hinge-coupled to a second of the lower brackets, which is coupled to the other-side support, and having a middle portion intersected by and hinge-coupled to the third support bar in a mutually pivotable manner, wherein the bottom support includes
- a pair of frame members having first frame members with one ends hinge-coupled to lower brackets of the lower brackets, which are coupled to the one-side support and include the first lower bracket, in a pivotable manner, and
- second frame members with one ends hinge-coupled to other ends of the first frame members in a pivotable manner and other ends of the second frame members being hinge-coupled to lower brackets of the lower brackets, which are coupled to the other-side support and include the second lower bracket, in a pivotable manner, and
- third frame members connected between the first frame members and the second frame members in one direction, the other direction and a width direction, and wherein the one ends of the first frame members and the other ends of the second frame members are pivoted and lifted when the one-side support and the other-side support are adjacent to each other, and the first frame members and the second frame members are lowered in parallel when the one-side support and the other-side support are spaced apart from each other.

4. A stroller comprising:

a support frame including
- a pair of vertical bars, lengths which are vertically controllable in a telescopic manner, and provided to be spaced apart from each other,
- a one-side support and an other-side support, respectively disposed at one side and an other side, to include horizontal bars each having both ends connected to the pair of vertical bars to support the pair of vertical bars, and
- side supports and a bottom support configured to connect the one-side support and the other-side support to form a square frame shape having an upper side opened with the one-side support and the other-side support, and form side frames and a bottom frame,
- wherein the side supports and the bottom support enable the one-side support and the other-side support to be adjacent to or spaced apart from each other in a folding manner in conjunction with lifting or lowering of the vertical bars;

extension rods respectively coupled to the vertical bars to be capable of vertically moving into or out of upper ends of the vertical bars;

safety belts;

an inner sheet formed in a shape corresponding to an internal space of the support frame to be accommodated in the internal space of the support frame, having one or both of one side and the other side coupled to the safety belts, and having coupling portions detachably coupled to the horizontal bars and the side supports at an upper end circumference thereof;

detachable members detachably coupled to the extension rods; and a sun cover coupled to the detachable members, integrally detached from and attached to the extension rods according to detachment and attachment of the detachable members from and to the extension rods, and configured to cover an upper side portion of the support frame, wherein one of the detachable members has a cylindrical shape, and includes one side of an outer circumferential surface having a first opening portion in which an extension rod of the extension rods is capable of being coupled or decoupled in a tight-insertion manner and the other side of the outer circumferential surface having a link portion in which middle portions of a second opening portion are spaced a certain distance from each other, and wherein the sun cover has a connection portion vertically penetrated at a corresponding position in which a respective one the extension rods is provided, is coupled to the one detachable member by an upper end and the other end of the connection portion being insertion-coupled to the link portion through the second opening portion and coupled inside the link portion, and is coupled to the respective one extension rod by the respective one extension rod being tightly inserted through the first opening portion.

5. A stroller comprising:

a support frame including
- a pair of vertical bars, lengths which are vertically controllable in a telescopic manner, and provided to be spaced apart from each other,
- a one-side support and an other-side support, respectively disposed at one side and an other side, to include horizontal bars each having both ends connected to the pair of vertical bars to support the pair of vertical bars, and side supports and a bottom support configured to connect the one-side support and the other-side support to form a square frame shape having an upper side opened with the one-side support and the other-side support, and form side frames and a bottom frame, wherein the side supports and the bottom support enable the one-side support and the other-side support to be adjacent to or spaced apart from each other in a folding manner in conjunction with lifting or lowering of the vertical bars;

extension rods respectively coupled to the vertical bars to be capable of vertically moving into or out of upper ends of the vertical bars;

safety belts;

an inner sheet formed in a shape corresponding to an internal space of the support frame to be accommodated in the internal space of the support frame, having one or both of one side and the other side coupled to the safety belts, and having coupling portions detachably coupled to the horizontal bars and the side supports at an upper end circumference thereof;

detachable members detachably coupled to the extension rods;

a sun cover coupled to the detachable members, integrally detached from and attached to the extension rods according to detachment and attachment of the detachable members from and to the extension rods, and configured to cover an upper side portion of the support frame;

upper brackets;

second support bars;

fourth support bars; and lead portions;

wherein hooking protrusions configured to protrude from an outside thereof are further formed at uppermost horizontal bars among the horizontal bars of the one-side support and the other-side support or one sides and other sides of the upper brackets, wherein the lead portions, are configured to extend from each of positions corresponding to both upper end portions of the side supports and having insertion holes insertion-coupled to the hooking protrusions are coupled to the inner sheet, and wherein the coupling portions of the inner sheet comprise cover portions configured to cover portions in which end portions of the second support bars and one end portions of the fourth support bars are hinge-coupled to each other and horizontal bar coupling portions configured to be detached and attached with hook and loop fasteners to surround the horizontal bars.

* * * * *